United States Patent
Verma et al.

(10) Patent No.: US 11,727,721 B2
(45) Date of Patent: Aug. 15, 2023

(54) METHODS AND APPARATUS TO DETECT DEEPFAKE CONTENT

(71) Applicant: McAfee, LLC, San Jose, CA (US)

(72) Inventors: Utkarsh Verma, Santa Clara, CA (US); Sherin M Mathews, Santa Clara, CA (US); Amanda House, Plano, TX (US); Carl Woodward, Santa Clara, CA (US); Celeste Fralick, Plano, TX (US); Jonathan King, Hillsboro, OR (US)

(73) Assignee: MCAFEE, LLC, San Jose, CA (US)

( * ) Notice: Subject to any disclaimer, the term of this patent is extended or adjusted under 35 U.S.C. 154(b) by 478 days.

(21) Appl. No.: 17/037,629

(22) Filed: Sep. 29, 2020

(65) Prior Publication Data

US 2021/0097260 A1 Apr. 1, 2021

Related U.S. Application Data

(60) Provisional application No. 62/908,570, filed on Sep. 30, 2019.

(51) Int. Cl.
*G06V 40/16* (2022.01)
*G06V 10/44* (2022.01)
(Continued)

(52) U.S. Cl.
CPC .......... *G06V 40/172* (2022.01); *G06V 10/449* (2022.01); *G06V 10/54* (2022.01);
(Continued)

(58) Field of Classification Search
None
See application file for complete search history.

(56) References Cited

U.S. PATENT DOCUMENTS 9,898,674 B2 * 2/2018 Connell, II .......... G06V 40/171
9,978,002 B2 * 5/2018 Schneiderman .. G06F 18/24323
(Continued)

FOREIGN PATENT DOCUMENTS

| CN | 107301396 A | * | 10/2017 | |
| CN | 108369785 A | * | 8/2018 | ............. G06F 21/32 |
| KR | 102476022 B1 | * | 8/2017 | |

OTHER PUBLICATIONS

Sanderson et al., Towards Pose-Invariant 2D Face Classification for Surveillance, Third International Workshop, AMFG, Proceedings. f (Year: 2007).*

(Continued)

*Primary Examiner* — Mohammed Rachedine
(74) *Attorney, Agent, or Firm* — Hanley, Flight & Zimmerman, LLC

(57) ABSTRACT

Methods, apparatus, systems and articles of manufacture are disclosed to detect deepfake content. An example apparatus to determine whether input media is authentic includes a classifier to generate a first probability based on a first output of a local binary model manager, a second probability based on a second output of a filter model manager, and a third probability based on a third output of an image quality assessor, a score analyzer to obtain the first, second, and third probabilities from the classifier, and in response to obtaining a first result and a second result, generate a score indicative of whether the input media is authentic based on the first result, the second result, the first probability, the second probability, and the third probability.

20 Claims, 14 Drawing Sheets

(51) Int. Cl.
*G06V 10/54* (2022.01)
*G06V 20/40* (2022.01)
*G06V 40/40* (2022.01)

(52) U.S. Cl.
CPC ............ *G06V 20/49* (2022.01); *G06V 40/171* (2022.01); *G06V 40/40* (2022.01); *G06V 40/45* (2022.01)

(56) References Cited

U.S. PATENT DOCUMENTS

| | | | | |
|---|---|---|---|---|
| 2014/0079297 | A1* | 3/2014 | Tadayon | G06V 40/172 382/118 |
| 2018/0181796 | A1* | 6/2018 | Wang | G06F 18/2413 |
| 2019/0147305 | A1* | 5/2019 | Lu | G06F 18/2413 382/157 |

OTHER PUBLICATIONS

Goodfellow et al., "Generative Adversarial Nets", Jun. 10, 2014, Université de Montréal, 9 pages.
Li et al., "In Ictu Oculi: Exposing AI Generated Fake Face Videos by Detecting Eye Blinking", Jun. 11, 2018, University at Albany, SUNY, 7 pages.
Mhou et al., "Face Spoof Detection Using Light Reflection in Moderate to Low Lighting", 2017, University of Johannesburg, 6 pages.
Soukupová, "Eye-Blink Detection Using Facial Landmarks", May 26, 2016, Czech Technical University in Prague, 55 pages.
Pech-Pacheco et al., "Diatom autofocusing in brightfield microscopy: a comparative study", Conference Pattern Recognition, 2000, Proceedings, 15th International Conference on vol. 3, Feb. 2000, 5 pages.
Ojala et al., "Multiresolution Gray-Scale and Rotation Invariant Texture Classification with Local Binary Patterns", Aug. 7, 2002, 7 pages.
Wikipedia, "Gabor Filter", https://en.wikipedia.org/wiki/Gabor_filter, retrieved on Dec. 24, 2020, 7 pages.
Open CV, "Image Filtering", https://docs.opencv.org/3.0-beta/modules/imgproc/doc/filtering.html, retrieved on Dec. 24, 2020, 17 pages.
Sci-Kit Image, "Local Binary Pattern for Texture Classification", https://scikit-image.org/docs/dev/auto_examples/features_detection/plot_local_binary_pattern.html, retrieved on Dec. 24, 2020, 5 pages.
Sci-Kit Image, "Random Forest Classifier", https://scikit-learn.org/stable/modules/generated/sklearn.ensemble.RandomForestClassifier.html, retrieved on Dec. 24, 2020, 7 pages.
Mittal et al., "No-Reference Image Quality Assessment in the Spatial Domain", IEEE Transactions on Image Processing, vol. 21, No. 12, Dec. 2012, 14 pages.
Sanderson et al., "Multi-Region Probabilistic Histograms for Robust and Scalable Identity Inference", University of Queensland, 2009, 10 pages.
Github, "imutils", https://libraries.io/github/jrosebr1/imutils, retrieved on Dec. 24, 2020, 14 pages.
Shrimali, "Image Quality Assessment: Brisque", https://www.learnopencv.com/image-quality-assessment-brisque/, retrieved on Dec. 24, 2020, 16 pages.
Open CV, "Face Detection using Haar Cascades", https://docs.opencv.org/3.4.1/d7/d8b/tutorial_py_face_detection.html, retrieved Dec. 24, 2020, 3 pages.
Viola et al., "Rapid Object Detection using a Boosted Cascade of Simple Features", Accepted Conference on Computer Vision and Pattern Recognition, 2001, 9 pages.
Yang et al., "Exposing Deep Fakes Using Inconsistent Head Poses", University at Albany, Nov. 13, 2018, 4 pages.

\* cited by examiner

| AGGD FIT TO MSCN COEFF. | | AGGD FIT TO HORIZONTAL PAIRWISE PRODUCTS | | | | AGGD FIT VERTICAL PAIRWISE PRODUCTS | | | | AGGD FIT TO DIAGONAL (LEFT) PAIRWISE PRODUCTS | | | | AGGD FIT TO DIAGONAL (RIGHT) PAIRWISE PRODUCT | | | | CLASS |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | |
| SHAPE | VARIANCE | SHAPE | MEAN | LEFT VARIANCE | RIGHT VARIANCE | SHAPE | MEAN | LEFT VARIANCE | RIGHT VARIANCE | SHAPE | MEAN | LEFT VARIANCE | RIGHT VARIANCE | SHAPE | MEAN | LEFT VARIANCE | RIGHT VARIANCE | |
| Arv(1.948) | 0.087 | Arv(0.653) | 0.0319 | 0.004 | 0.013 | Arv(0.642) | 0.038 | 0.003 | 0.015 | Arv(0.688) | 0.012 | 0.006 | 0.009 | Arv(0.684) | 0.012 | 0.006 | 0.009 | - |
| Arv(1.95) | 0.173 | Arv(0.665) | 0.030 | 0.026 | 0.044 | Arv(0.656) | 0.070 | 0.0159 | 0.057 | Arv(0.709) | -0.006 | 0.0322 | 0.0286 | Arv(0.707) | -0.007 | 0.032 | 0.028 | - |
| Arv(1.924) | 0.87 | Arv(0.64) | 0.029 | 0.004 | 0.013 | Arv(0.631) | 0.037 | 0.003 | 0.0156 | Arv(0.675) | 0.011 | 0.006 | 0.096 | Arv(0.721) | 0.028 | 0.021 | 0.036 | 1 |
| Arv(1.945) | 0.174 | Arv(0.664) | 0.028 | 0.026 | 0.043 | Arv(0.654) | 0.071 | 0.016 | 0.059 | Arv(0.711) | -0.007 | 0.032 | 0.028 | Arv(0.71) | -0.007 | 0.032 | 0.028 | 0 |

902 DATASET HAS 49 REAL VIDEOS AND 49 FAKE VIDEOS
- ROC-AUC: 0.987
- FALSE POSITIVE RATE: 0.996%
- FALSE NEGATIVE RATE: 11.903%
- TRUE POSITIVE RATE: 88.097%
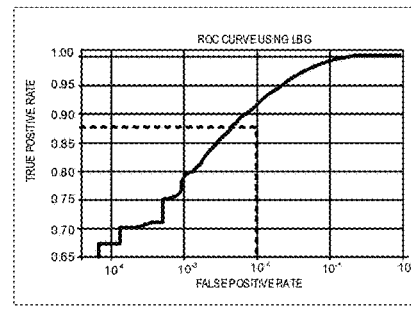
904 DATASET HAS 320 FAKE VIDEOS AND 320 REAL VIDEOS
- ROC-AUC: 0.992
- FALSE POSITIVE RATE: 0.999%
- FALSE NEGATIVE RATE: 5.111%
- TRUE POSITIVE RATE: 94.888%
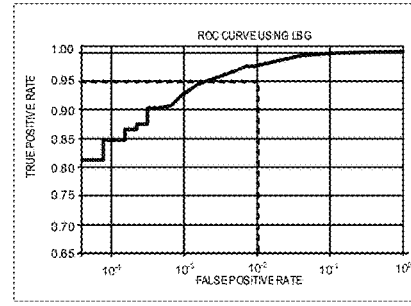
FIG. 9

METHODS AND APPARATUS TO DETECT DEEPFAKE CONTENT

RELATED APPLICATION

This patent arises from a continuation of U.S. Provisional Patent Application Ser. No. 62/908,570, which was filed on Sep. 30, 2019. U.S. Provisional Patent Application Ser. No. 62/908,570 is hereby incorporated herein by reference in its entirety. Priority to U.S. Provisional Patent Application Ser. No. 62/908,570 is hereby claimed.

FIELD OF THE DISCLOSURE

This disclosure relates generally to artificial intelligence, and, more particularly, to methods and apparatus to detect deepfake content.

BACKGROUND

A deepfake is media (e.g., an image, video, and/or audio) that was generated and/or modified using artificial intelligence. In some examples, a deepfake creator may combine and/or superimpose existing images and/or video onto a source image and/or video to generate the deepfake. As artificial intelligence (e.g., neural networks, deep learning, machine learning, and/or any other artificial intelligence technique) advances, deepfake media has become increasingly realistic and may be used to generate fake news, pranks, and/or fraud.

BRIEF DESCRIPTION OF THE DRAWINGS

FIG. 8 illustrates features extracted for use by the image quality assessor of FIGS. 2A and/or 2B to perform image quality assessment.

FIG. 9 includes example results obtained and/or otherwise produced by the deepfake analyzer of FIGS. 1, 2A, and/or 2B.

Figure 1:
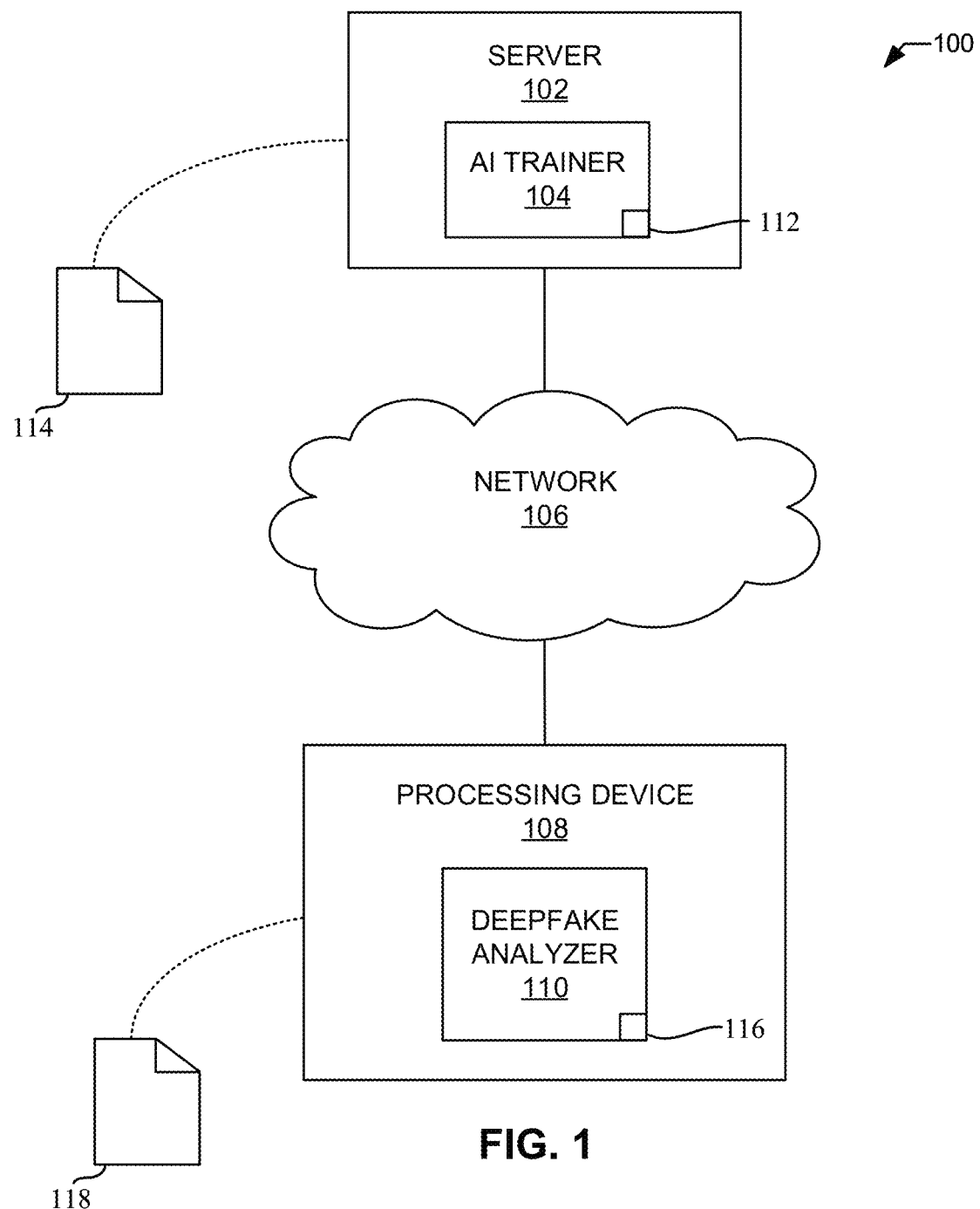
FIG. 1 illustrates a block diagram of an example environment including an example server, an example AI trainer, an example network, an example processing device, and an example deepfake analyzer.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second.

DETAILED DESCRIPTION

As software tools advance and are widely distributed and shared, the ability for users to use such software for a malicious purpose also increases. For example, the production and quality of deepfakes has significantly increased with advances in software. Deepfakes may be generated to depict fake videos of people (e.g., celebrities or politicians) that appear to misrepresent them by manipulating their identity, words, and/or actions (e.g., show the people saying or doing things that that they did not actually say). Deepfakes are becoming increasingly realistic as artificial intelligence technology advances. Being able to identify and detect deepfakes accurately is important because deepfakes could be detrimental (e.g., used to create a lot of harm, fake emergency alerts, fake videos to destroy someone's reputation, or fake video and/or audio of politicians during an election).

Similarly, the production of spoof attacks has increased significantly with advances in software. Spoof attacks are a type of adversarial attack based on techniques involving high definition photographs, three-dimensional (3D) masks, video-replay attacks using high resolution screens, etc. Often, spoof attacks involve methods to trick facial recognition systems and/or biometric systems. For example, facial recognition systems and/or biometric systems can face attacks such as a presentation attack and/or a database attack. In a presentation attack, an attacker pretends to be an authenticated user by tricking the facial recognition system and/or biometric system into granting them access by using either a photograph, mask, and/or video of the authenticated user. In a database attack, the attacker tampers with communication between the biometric sensor and/or feature extractor to insert fake biometrics data into the database. In face recognition systems, replay attacks (in which a pre-recorded video of the user is played out) and printed photograph attacks are the two types of attacks.

Deepfakes, on the other hand, are often created using a generative adversarial network (GAN) and other machine learning techniques. GAN's are typically composed of two neural networks, a generator network and a discriminator network. During a training operation of a GAN, the generator attempts to model a distribution of individual classes while the discriminator attempts to learn the boundary between classes. The outcome of this process is that the generator learns how to create highly authentic data. In the context of deepfakes, a generator learns how to generate fake content (e.g., a fake face, a deepfake, etc.) that looks like authentic content (e.g., an authentic face, etc.).

Because deepfakes are superior, in the degree of deception, to spoof attacks, it is difficult for humans to identify real media versus deepfake media. In addition, artificial intelligence can be used to process media to be able to identify media as real or deepfake. For example, a neural network (e.g., convolution neural network (CNN)) may be trained based on known real and deepfake media so that the multiple layers of deep learning of the CNN can receive input media and identify whether the input media is real or a deepfake.

Some approaches to detect malicious attacks involve utilizing computer vision techniques to identify reflection of light off an object in an image. In this manner, such approaches are targeted towards spoof attacks and identify two-dimensional (2D) photographs from real faces. For example, such an approach may attempt to identify whether there are inconsistent shadows and/or a light projection on a face. However, such approaches do not target deepfake attacks.

Another approach to detect malicious attacks involves using a Recurrent Neural Network (RNN) to detect eye-blinking. Considering the improvements in adversarial deepfakes, detecting the presence of eye-blinks is no longer a viable solution for deepfakes. Furthermore, such an approach tends to produce a high false positive rate when the content (e.g., a deepfake video) is short in duration.

Examples disclosed herein include methods and apparatus to detect deepfake content. Examples disclosed herein utilize computer vision techniques such as, for example, facial recognition, Gabor filters, Image Quality Assessment, Local Binary Patterns, Blur Detection using Laplacian Variance, etc., to analyze various patterns introduced in a video. Furthermore, examples disclosed herein utilize a scoring technique based on the above-mentioned techniques to identify whether a video is malicious (e.g., a fake video, a deepfake, etc.), or authentic (e.g., real). As a result, examples disclosed herein enable accurate detection of a deepfake video. As used herein, malicious media may refer to any media that is fake, artificially generated, manufactured to portray images, video and/or audio that portray events or sounds that did not actually occur, not real (e.g., a deepfake), etc.

Examples disclosed herein include utilizing an example image quality assessor to determine and/or otherwise identify pixel intensities of an example input media. Examples disclosed herein include normalizing pixel intensities of an input media and calculating pixel distribution over the normalized intensities. Because malicious videos (e.g., fake videos, deepfakes, etc.), are not naturally shot and, instead, are generated using a ML algorithm, such generated videos will be prone to having noise captured in the training data of the source video. Typically, authentic and/or otherwise real videos (e.g., authentic and/or otherwise real input media) include pixel intensities that follow a Gaussian distribution after normalization. On the contrary, malicious (e.g., fake, deepfake, etc.) videos often include pixel intensities that do not follow a Gaussian Distribution after normalization. In examples disclosed herein, the deviation of the distribution from an ideal depiction (e.g., a bell curve) is a measure of the amount of distortion introduced in a generated video.

An example apparatus disclosed herein includes an eye detection model manager to generate a first result based on an eye aspect ratio corresponding to input media, a blur detection model manager to generate a second result based on determining a blur value corresponding to the input media, a local binary model manager to generate a third result based on identifying local binary patterns of the input media, a filter model manager to generate a fourth result based on applying a filter to the input media, an image quality assessor to generate a fifth result based on extracting features of the input media, and a score analyzer to generate a score indicative of whether the input media is authentic and/or real based on the first result, the second result, the third result, the fourth result, and the fifth result.

FIG. 1 illustrates a block diagram of an example environment 100 including an example server 102, an example AI trainer 104, an example network 106, an example processing device 108, and an example deepfake analyzer 110. Although the example environment 100 illustrates the deepfake analyzer 110 in the example processing device 108, the example deepfake analyzer 110 may additionally or alternatively be implemented in the example server 102, as further described below.

The example server 102 of FIG. 1 includes the example AI trainer 104. The AI trainer 104 trains an example AI model 112 based on an example input dataset 114. In the example illustrated in FIG. 1, the input dataset 114 may be a dataset of pre-classified media. For example, the input dataset 114 may include 10,000 video frames that have already been correctly identified as real or a deepfake. The AI trainer 104 may utilize all or part of the input dataset 114 to train the AI model 112 to learn to classify video frames based on the characteristics of the video frames and corresponding classifications in the known data set. In some examples, the training of the AI model 112 (e.g., a deepfake classification model) includes using a portion of the input dataset 114 for training and a portion of the input dataset 114 for testing the AI model 112. In this manner, the AI trainer 104 can use any misclassifications (e.g., false negatives or false positives) during training of the AI model 112 to tune the AI model 112 to avoid future misclassifications.

Once the example AI trainer 104 trains the AI model 112, the AI trainer 104 deploys the AI model 112 so that it can be implemented on another device (e.g., the example processing device 108). For example, the AI trainer 104 transmits the AI model 112 to the processing device 108 via the network 106 to facilitate deepfake detection. In some examples, the AI model 112 corresponds to a set of weights that are applied to neurons in a convolutional neural network (CNN). Accordingly, the example AI trainer 104 can deploy the AI model 112 by generating and transmitting data (e.g., data packets, instructions, executables, etc.) that identifies how to weight the neurons of a CNN to implement the AI model 112. When the example processing device 108 receives the data/instructions/executables (e.g., the AI model 112), the processing device 108 can execute the instructions to adjust the weights of an example processing model 116 so that the processing model 116 implements the functionality of the trained, AI model 112. The example server 102 and/or the example AI trainer 104 of the illustrated example of FIG. 1 is/are implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

The example network 106 of FIG. 1 is a system of interconnected systems exchanging data. The example network 106 may be implemented using any type of public or private network such as, but not limited to, the Internet, a telephone network, a local area network (LAN), a cable network, and/or a wireless network. To enable communication via the network 106, the example processing device 108 and/or the server 102 include(s) a communication interface that enables a connection to an Ethernet, a digital subscriber line (DSL), a telephone line, a coaxial cable, or any wireless connection, etc.

The example processing device 108 of FIG. 1 is a computing device that receives instructions, data, and/or executables corresponding to the AI model 112. The deepfake analyzer 110 of the processing device 108 uses the instructions, data, and/or executable to implement the AI model 112 locally at the processing device 108. The example processing device 108 of FIG. 1 is a computer. Alternatively, the example processing device 108 may be a laptop, a tablet, a smart phone, a personal processor, a server, and/or any other type of processing device. In this example, the example processing device 108 includes the example deepfake analyzer 110. The example processing device 108 of the illustrated example of FIG. 1 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In the example of FIG. 1, the example deepfake analyzer 110 configures the processing model 116 (e.g., a neural network) to implement the AI model 112. For example, the deepfake analyzer 110 adjusts the weights of the neurons in the processing model 116 based on the received instructions (e.g., the AI model 112). In response to implementing the AI model 112 using the processing model 116, the deepfake analyzer 110 obtains example input media 118. Using the obtained input media 118, the deepfake analyzer 110 generates an output (e.g., a score) identifying whether the input media 118 is authentic or fake (e.g., a deepfake). In some such examples, if the score is between 0 and 0.5 (e.g., greater than or equal to 0 and less than or equal to 0.5), the deepfake analyzer 110 classifies the media as a deepfake. Alternatively, if the score is between 0.5 and 1 (e.g., greater than 0.5 and less than or equal to 1), the deepfake analyzer 110 classifies the media as authentic. The example deepfake analyzer 110 generates a report including the classification and transmits the report to the example AI trainer 104 at the server 102. Additional description of the deepfake analyzer 110 is described below in connection with FIGS. 2A and/or 2B.

In some examples, the deepfake analyzer 110 of FIG. 1 may be implemented in the AI trainer 104. For example, the deepfake analyzer 110 may be utilized to provide feedback when testing the AI model 112. In such an example, the server 102 may include a database (e.g., memory) including a training dataset of, for example, 1000 images and/or video frames. Some of the images are authentic while others are deepfakes. The classifications (e.g., authentic vs. deepfake) are known to the AI trainer 104 prior to training. Once the initial training is complete, the initially trained AI model 112 is implemented in the deepfake analyzer 110.

In operation, the example AI trainer 104 obtains the input dataset 114 for use in training the AI model 112. Once trained, the AI trainer 104 may transmit, or the example processing device 108 may request, the AI model 112 to the processing device 108. In this manner, the deepfake analyzer 110, using the AI model 112, can adjust weights in the processing model 116. Accordingly, using the processing model 116, the deepfake analyzer 110 is configured to determine whether example input media 118 is authentic or fake (e.g., a deepfake).

Figure 2A:
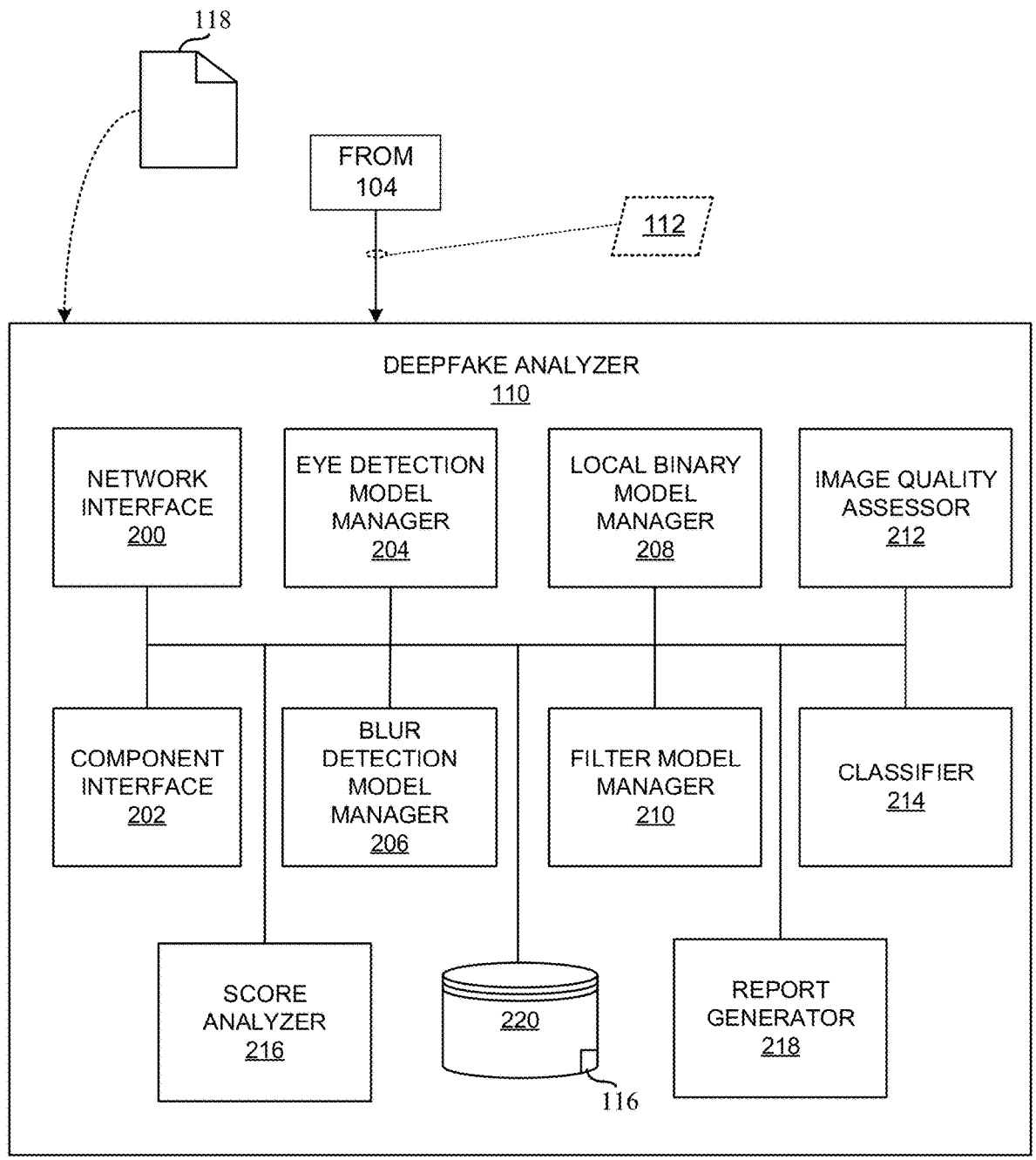
FIG. 2A is block diagram of an example implementation of the deepfake analyzer of FIG. 1.

FIG. 2A is block diagram of an example implementation of the deepfake analyzer 110 of FIG. 1. The example deepfake analyzer 110 includes an example network interface 200, an example component interface 202, an example eye detection model manager 204, an example blur detection model manager 206, an example local binary model manager 208, an example filter model manager 210, an example image quality assessor 212, an example classifier 214, an example score analyzer 216, an example report generator 218, and an example data store 220. In other examples disclosed herein, the deepfake analyzer 110 may include a facial detector configured to obtain the input media 118 of FIG. 1 and detect facial features and/or facial outlines. Such detected facial features and/or facial outlines may be transmitted to any of the example network interface 200, the example component interface 202, the example eye detection model manager 204, the example blur detection model manager 206, the example local binary model manager 208, the example filter model manager 210, the example image quality assessor 212, the example classifier 214, the example score analyzer 216, the example report generator 218, and the example data store 220.

The example network interface 200 of FIG. 2A obtains the example AI model 112 from the example AI trainer 104 via the example network 106. For example, the network interface 200 may receive the AI model 112 (e.g., instructions that identify a set of weights to apply to the neurons of a CNN to implement the trained model) from the example AI trainer 104. The AI model 112 corresponds to instructions to implement the processing model 116 based on training that occurred at the AI trainer 104. Additionally, the network interface 200 is configured to obtain example input media 118. In examples disclosed herein, the input media 118 may be any suitable media (e.g., a video, a picture, etc.) in which the deepfake analyzer 110 is to determine whether the media is authentic or a deekfake.

Additionally, the network interface 200 may transmit reports to the example AI trainer 104. For example, when the example classifier 214 classifies the input media 118, the report generator 218 may generate a report identifying or otherwise including the input media 118 and the corresponding classification (e.g., authentic/deepfake and/or the classification score). The example network interface 200 can transmit the report to the AI trainer 104 to provide feedback for subsequent training and/or modifying of the AI model 112. The example network interface 200 of the illustrated example of FIG. 2A is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

The example component interface 202 of FIG. 2A transmits and/or receives data to/from other components of the example processing device 108 and/or the AI trainer 104 (e.g., when the deepfake analyzer 110 is implemented in the example server 102). For example, the component interface 202 may receive media (e.g., images, video, and/or audio) that is stored in and/or received by the example processing device 108 for deepfake classification. When the example deepfake analyzer 110 is implemented in the example server 102, the component interface 202 may receive the AI model 112 and provide feedback (e.g., reports) to the example AI trainer 104. In some examples, the component interface 202 may store reports generated by the report generator 218 in the example data store 220. The example component interface 202 of the illustrated example of FIG. 2A is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

The example eye detection model manager 204 of FIG. 2A is configured to detect a human face in the input media 118. In examples disclosed herein, the eye detection model manager 204 detects a human face using Haar features. As used herein, Haar features refer to image features that are used when determining boundaries and/or objects in an image. The eye detection model manager 204 further identifies and/or otherwise determines facial landmarks (e.g., a nose, eyes, mouth, etc.). In some examples disclosed herein, the eye detection model manager 204 may identify and/or otherwise determine facial landmarks using a toolkit such as dlib C++. In response to identifying and/or otherwise determining the facial landmarks, the eye detection model manager 204 extracts a portion of the input media 118 that represents the eyes. In other examples disclosed herein, the eye detection model manager 204 is configured to obtain data corresponding to a detected human face from a face detector implementing a facial recognition technique. In such a manner, the eye detection model manager 204 determines (e.g., calculates) an eye aspect ratio (EAR). The eye aspect ratio can be determined by the eye detection model manager 204 using the below equation, equation 1.

$$EAR = \frac{\|p2 - p6\| + \|p3 - p5\|}{2\|p1 - p4\|} \quad \text{Equation 1}$$

Figure 4:
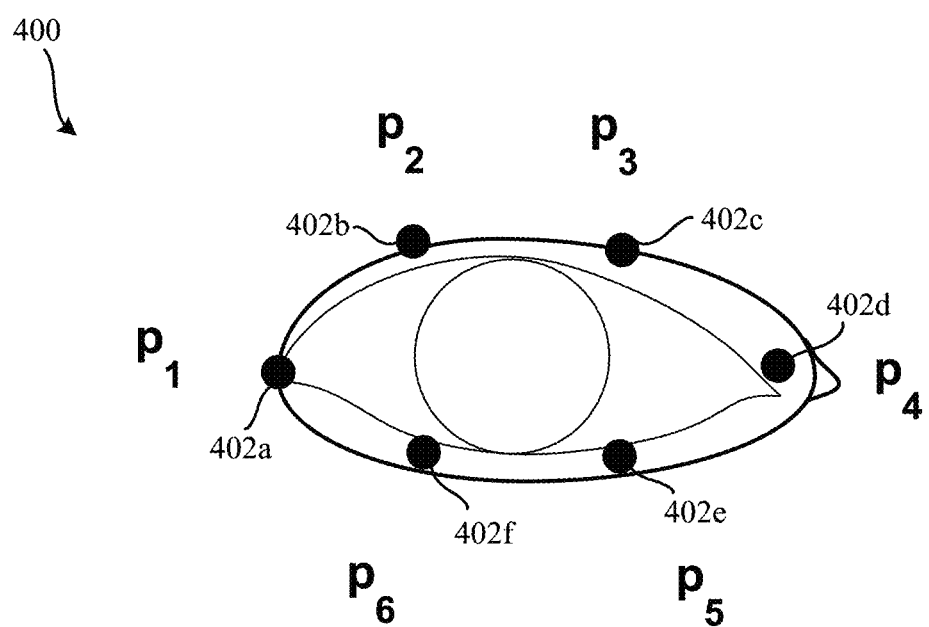
FIG. 4 illustrates an example eye and corresponding points used to calculate an example eye aspect ratio.

In equation 1, the variable EAR corresponds to the eye aspect ratio and the variables p1, p2, p3, p4, p5, and p6 correspond to identified points in the eye, as illustrated in FIG. 4.

In examples disclosed herein, the eye detection model manager 204 detects whether a blink occurred if the EAR satisfies a threshold. For example, if the EAR is less than a threshold, the eye detection model manager 204 may determine a blink occurred. In a further example, the threshold may be 0.25 based on a time of four frames. As such, if the EAR is less than 0.25 for four consecutive frames of a video, the eye detection model manager 204 may identify a blink occurred. In examples disclosed herein, the eye detection model manager 204 operates utilizing a facial landmarks predictor, EAR, and a threshold value to detect eye blink. In the event the eye detection model manager 204 determines that an eye blink occurred (e.g., the EAR satisfies a threshold), then the eye detection model manager 204 generates a result as a binary value of 1. Alternatively, in the event the eye detection model manager 204 determines that an eye blink did not occur (e.g., the EAR does not satisfy a threshold), then the eye detection model manager 204 generates a result as a binary value of 0. In examples disclosed herein, the eye detection model manager 204 transmits the result to the score analyzer 216.

In other examples disclosed herein, in the event the eye detection model manager 204 determines that an eye blink occurred (e.g., the EAR satisfies a threshold), then the eye detection model manager 204 generates a result as a binary value of 0, and/or any suitable result indicating an eye blink has occurred. In other examples disclosed herein, in the event the eye detection model manager 204 determines that an eye blink did not occur (e.g., the EAR does not satisfy a threshold), then the eye detection model manager 204 generates a result as a binary value of 1, and/or any suitable result indicating an eye blink has not occurred.

In examples disclosed herein, the eye detection model manager 204 may determine a number of eye blinks in the input media 118 in the event the input media 118 is a video.

The example eye detection model manager 204 of the illustrated example of FIG. 2A is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

The example blur detection model manager 206 of FIG. 2A is configured to convolve the input media 118 by the Laplacian kernel to calculate the variance of the result. In examples disclosed herein, the blur detection model manager 206 may calculate the variance of the resultant 2D matrix (e.g., the matrix generated by convolving each frame of the video with the Laplacian Kernel). An example Laplacian kernel is illustrated below, in Expression 1.

$$\begin{pmatrix} 0 & 1 & 0 \\ 1 & -4 & 1 \\ 0 & 1 & 0 \end{pmatrix} \quad \text{Expression 1}$$

As such, the example blur detection model manager 206 may be utilized to identify degree of blur involved in input media 118 based on the variance. In examples disclosed herein, the blur detection model manager 206 identifies the degree of blur for each frame in the input media 118. Accordingly, the blue detection model manager 206 generates an example result to be sent to the score analyzer 216. In examples disclosed herein, the result generated by the blur detection model manager 206 is an average result of the degree of blur across all frames in the input media 118. The blur detection model manager 206 implements blur detection techniques using Laplacian kernels. However, in other examples disclosed herein, the blur detection model manager 206 may be a machine learning model, a deep learning model, another type of neural network, and/or any other type of model and/or network. The example blur detection model manager 206 of the illustrated example of FIG. 2A is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In FIG. 2A, the local binary model manager 208 obtains and/or otherwise identifies a pattern in the input media 118 to assist in distinguishing between a real and a malicious (e.g., a deepfake, etc.) video. The example local binary model manager 208 of FIG. 2A is implemented using a neural network. For example, the local binary model manager 208 may be a machine learning model, a deep learning model, another type of neural network, and/or any other type of model and/or network. Initially, the example local binary model manager 208 is not initialized with any weights (e.g., the neurons are not yet weighted). However, in response to the network interface 200 obtaining the AI model 112 from the server 102, the local binary model manager 208 is configured to operate according to the AI model 112 generated by the example AI trainer 104. For example, neurons of the example local binary model manager 208 are weighted based on the AI model 112.

Once trained, the example local binary model manager 208 obtains the input media 118 (e.g., images, video frames, and/or audio) from the component interface 202. The local binary model manager 208 executes a Local Binary Pattern (LBP) technique to compute a local representation of texture of a frame of the input media 118. For example, the local binary model manager 208 compares each pixel with its surrounding neighborhood of pixels in the input media 118. In addition, the local binary model manager 208 produces a histogram corresponding to various features and/or changes in texture in the input media 118. In examples disclosed herein, the local binary model manager 208 executes an LBP operation for each frame in the input media 118. Accordingly, the local binary model manager 208 generates histogram to be sent to the classifier 214. In examples disclosed herein, the histogram generated by the local binary model manager 208 may be referred to as a result of the local binary model manager 208. In examples disclosed herein, the result generated by the local binary model manager 208 is an average result across all frames in the input media 118.

In examples disclosed herein, the local binary model manager 208 transmits the histogram to the classifier 214. Example results of the local binary model manager 208 are described below, in connection with FIGS. 5 and/or 6. The example local binary model manager 208 of the illustrated example of FIG. 2A is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

The example filter model manager 210 of FIG. 2A is implemented using a neural network model. For example, the filter model manager 210 may be a machine learning model, a deep learning model, another type of neural network, and/or any other type of model and/or network. Initially, the example filter model manager 210 is not initialized with any weights (e.g., the neurons are not yet weighted). However, in response to the AI model 112 being obtained by the network interface 200, the filter model manager 210 is configured to operate according to the AI model 112 generated by the example AI trainer 104. For example, neurons of the example filter model manager 210 are weighted based on the AI model 112.

Once trained, the example filter model manager 210 obtains the input media 118 (e.g., images, video frames, and/or audio) from the component interface 202. In an example operation, the filter model manager 210 applies Gabor filters to the input media 118 by convolving a kernel or mask with the input media 118 which, in turn, filters certain frequencies or signals from the input media 118. When the filter model manager 210 applies a Gabor filter to the input media 118, the result is a corresponding combination of signals extracted from the frame(s) of the input media 118. In this manner, the filter model manager 210 convolves the array over every pixel of the input media 118. Such a process performed by the filter model manager 210 may be done for each frame of the input media 118. The filter model manager 210 may extract corresponding signals utilizing the below equation, equation 2.

$$g(x, y; \lambda, \theta, \psi, \sigma, \gamma) = \exp\left(-\frac{x'^2 + \gamma^2 y'^2}{2\sigma^2}\right) \exp\left(i\left(2\pi\frac{x'}{\lambda} + \psi\right)\right) \quad \text{Equation 2}$$

In equation 2, the variables x and y correspond to the size of the Gabor kernel. In examples disclosed herein, the size of the Gabor kernel is set to 21. In other examples disclosed herein, any suitable Gabor kernel size may be utilized.

In equation 2, the variable σ corresponds to the standard deviation of the Gaussian function used in the Gabor filter. In examples disclosed herein, σ is 5. However, in other examples disclosed herein, any suitable value for σ may be used.

In equation 2, the variable θ corresponds to the orientation of the normal to the parallel stripes of the Gabor function. In examples disclosed herein, θ corresponds to sixteen values to result in sixteen different filters (e.g., 0, 11.25, 22.5, 33.75, 45, 56.25, 67.5, 78.75, 90, 101.25, 112.5, 135, 146.25, 157.5, 168.75, 180). In other examples disclosed herein, any number of values and/or value magnitude may be used for θ.

In equation 2, the variable λ corresponds to the wavelength of the sinusoidal factor in the above equation. In examples disclosed herein, λ is 31. However, in other examples disclosed herein, any suitable value for λ may be used.

In equation 2, the variable γ corresponds to the spatial aspect ratio. In examples disclosed herein, γ is 0.5. However, in other examples disclosed herein, any suitable value for γ may be used.

In equation 2, the variable ψ corresponds to the phase offset. In examples disclosed herein, ψ is 75. However, in other examples disclosed herein, any suitable value for ψ may be used.

Furthermore, the filter model manager 210 extracts a combination of signals related to edges at different orientations and/or texture changes at different orientations by altering the value of theta to sixteen equally distributed values from zero to one hundred and eighty degrees.

In examples disclosed herein, the filter model manager 210 convolves the filtered input media 118 with a gray image or frame (e.g., a 2D array) to obtain a histogram representative of a signal. In examples disclosed herein, the histogram generated by the filter model manager 210 may be referred to as a result of the filter model manager 210. In examples disclosed herein, the result generated by the filter model manager 210 is an result across all frames in the input media 118. For example, the filter model manager 210 may generate an individual result for each frame of the input media 118. In this manner, the result transmitted by the filter model manager 210 may be an average value of the individual results across each frame of the input media 118.

In examples disclosed herein, the filter model manager 210 transmits the histogram to the classifier 214. Example results of the filter model manager 210 are described below, in connection with FIG. 7.

The example filter model manager 210 of the illustrated example of FIG. 2A is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In the example illustrated in FIG. 2A, the image quality assessor 212 is implemented using a neural network. For example, the image quality assessor 212 may be a machine learning model, a deep learning model, another type of neural network, and/or any other type of model and/or network. Initially, the example image quality assessor 212 is not initialized with any weights (e.g., the neurons are not yet weighted). However, in response to the network interface 200 obtaining the AI model 112 from the server 102, the image quality assessor 212 is configured to operate according to the AI model 112 generated by the example AI trainer 104. For example, neurons of the example image quality assessor 212 are weighted based on the AI model 112.

Once trained, the example image quality assessor 212 obtains input media 118 (e.g., images, video frames, and/or audio) from the component interface 202. In operation, the example image quality assessor 212 extracts different features from the input media 118 by fitting the input media 118 to a distribution (e.g., a Generalized Gaussian Distribution and an Asymmetric Gaussian Distribution). In examples disclosed herein, the image quality assessor 212 utilizes techniques such as, for example, BRISQUE, as an approach to an image quality assessment algorithms (e.g., Peak Signal to Noise Ratio and Structural Similarity Index). In examples disclosed herein, the features extracted by the image quality assessor 212 may be referred to as a result of the image quality assessor 212. In examples disclosed herein, the result generated by the image quality assessor 212 is an average result across all frames in the input media 118.

In examples disclosed herein, the image quality assessor 212 transmits the result (e.g., the extracted features) to the classifier 214. The example image quality assessor 212 of the illustrated example of FIG. 2A is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In the example illustrated in FIG. 2A, the classifier 214 is implemented using a tree-based classification model such as, for example, a random forest. In other examples disclosed herein, the classifier 214 may be implemented using a neural network. In such examples, the classifier 214 may be a machine learning model, a deep learning model, another type of neural network, and/or any other type of model and/or network. Further in such an example, the example classifier 214 is not initialized with any weights (e.g., the neurons are not yet weighted). However, in response to the network interface 200 obtaining the AI model 112 from the server 102, the classifier 214 is configured to operate according to the AI model 112 generated by the example AI trainer 104. For example, neurons of the example classifier 214 are weighted based on the AI model 112.

In operation, the classifier 214 obtains outputs (e.g., results) of the local binary model manager 208 (e.g., a histogram corresponding to various features and/or changes in texture), the filter model manager 210 (e.g., a histogram corresponding to a final signal of the filter model manager 210), and the image quality assessor 212 (e.g., extracted features). In addition, in some examples disclosed herein, the classifier 214 obtains the output of the eye detection model manager 204. As such, the classifier 214 generates a probability based on each of the outputs (e.g., results) from the local binary model manager 208 (e.g., a histogram corresponding to various features and/or changes in texture), the filter model manager 210 (e.g., a histogram corresponding to a final signal of the filter model manager 210), the image quality assessor 212 (e.g., extracted features), and/or the eye detection model manager 204 (e.g., an indication corresponding to whether a blink occurred). Such generated probabilities correspond to a likelihood of the input media 118 being authentic or a deepfake. In examples disclosed herein, the classifier 214 transmits the probabilities to the score analyzer 216.

In some examples disclosed herein, the classifier 214 may utilize deepfake video datasets such as, for example, Vid-Timit and/or UADFV, to be trained. The classification algorithm utilized may be, for example, the Scikit Learning implementation of Random Forest. In examples disclosed herein, the training parameters may be the following:

n_estimators=20
max_depth=22
min_samples split=10

The example classifier 214 of the illustrated example of FIG. 2A is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In other examples disclosed herein, any of the local binary model manager 208, the filter model manager 210, and/or the image quality assessor 212 may include the example classifier 214.

In the illustrated example of FIG. 2A, the score analyzer 216 utilizes an algorithm to combine the result of the eye detection model manager 204, the result of the blur detection model manager 206, the probability generated by the classifier 214 corresponding to the result of the local binary model manager 208, the probability generated by the classifier 214 corresponding to the result of the filter model manager 210, and/or the probability generated by the classifier 214 corresponding to the result of the image quality assessor 212 to generate a score. In examples disclosed herein, the score analyzer 216 may utilize the following equation, equation 3, to generate the score.

$$\text{Score} = G^*\text{AvgGabor} + I^*\text{AvgIQ} + B^*\text{AvgBlur} + EBC^*\text{EyeBlinkingDetector} + LBP^*\text{AvgLBP} \quad \text{Equation 3}$$

In equation 3, the variable G corresponds to the Gabor coefficient, the variable I corresponds to the Image Quality coefficient, the variable B corresponds to the Blur coefficient, the variable EBC corresponds to the Eye Blinking coefficient, the variable LPB corresponds to the Local Binary Pattern coefficient. The variable EyeBlinkingDetector corresponds to the result of the eye detection model manager 204, the variable AvgBlur corresponds to the average degree of blur based on the result of the blur detection model manager 206, the variable AvgLBP corresponds to the probability generated by the classifier 214 based on the result of the local binary model manager 208, the variable AvgGabor corresponds to the probability generated by the classifier 214 based on the result of the filter model manager 210, and the variable AvgIQ corresponds to the probability generated by the classifier 214 based on the result of the image quality assessor 212.

In examples disclosed herein, the score has a lower bound of 0 and an upper bound of 1. For example, on examples disclosed herein, the score is normalized between 0 and 1. However, any other form of numerical processing may be utilized to adjust the score.

In some examples disclosed herein, the coefficients included in equation 3 may be altered responsive to determining the variable AvgBlur. Examples below illustrate three formats corresponding to different AvgBlur values.

While it is noted the below formats include numerical coefficients, any suitable numerical coefficient may be utilized.

Format 1: Average blur scores less than or equal to 20, Gabor Coefficient (G)=1.6, Image Quality Coefficient (I)=1.8, Blur Coefficient (B)=0.01, Eye Blinking Coefficient (EBC)=0.1, Local Binary Patterns (LBP)=0.05.

Format 2: Average blur scores between 20 and 600, Gabor Coefficient (G)=2.2, Image Quality Coefficient (I)=2.0, Blur Coefficient (B)=0, Eye Blinking Coefficient (EBC)=0.1, Local Binary Patterns (LBP)=0.

Format 3: Average blur scores greater than 600, Gabor Coefficient (G)=2, Image Quality Coefficient (I)=2.2, Blur Coefficient (B)=(−0.05), Eye Blinking Coefficient (EBC)=0.1, Local Binary Patterns (LBP)=0.05.

In examples disclosed herein, the scoring technique may be enhanced based on empirical testing of the above-mentioned techniques (e.g., the techniques implemented by the deepfake analyzer 110, techniques implemented by the eye detection model manager 204, the blur detection model manager 206, the local binary model manager 208, the filter model manager 210, the image quality assessor 212, and/or the classifier 214) on real videos and deepfake videos of different qualities. Such enhancement enables the determination of threshold values. Additionally, this scoring technique includes weights for each individual technique (e.g., techniques implemented by the eye detection model manager 204, the blur detection model manager 206, the local binary model manager 208, the filter model manager 210, the image quality assessor 212, and/or the classifier 214) according to performance in operation. The example score analyzer 216 of the illustrated example of FIG. 2A is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

The example report generator 218 of FIG. 2A obtains the score from the score analyzer 216. The report generator 218 determines whether (e.g., classifies) the input media 118 is real or a deepfake based on the score from the score analyzer 216. For example, if the score is greater than or equal to 0 and less than or equal to 0.5, the report generator 218 determines that the input media 118 is a deepfake. Alternatively, if the score is between a 0.50 and a 1.0 (e.g., greater than 0.50 and less than or equal to 1), the report generator 218 determines that the input media 118 is authentic. The example report generator 218 generates a report identifying and/or including the input media 118 and/or the classification. The example report generator 218 instructs the network interface 200 and/or the component interface 202 to transmit the report to the example AI trainer 104. In some examples, the report generator 218 instructs the component interface 202 to interface with storage to store the report. The example report generator 218 of the illustrated example of FIG. 2A is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

In the example of FIG. 2A, the data store 220 is configured to store the AI model 112, the processing model 116, and/or the input media 118. In addition, the data store 220 may store any of the results obtained from the eye detection model manager 204, the blur detection model manager 206, the local binary model manager 208, the filter model manager 210, the image quality assessor 212, the classifier 214, the score analyzer 216, and/or the report generator 218. The example data store 220 of the illustrated example of FIG. 2A may be implemented by any device for storing data such as, for example, flash memory, magnetic media, optical media, etc. Furthermore, the data stored in the example data store 220 may be in any data format such as, for example, binary data, comma delimited data, tab delimited data, structured query language (SQL) structures, etc.

Figure 2B:
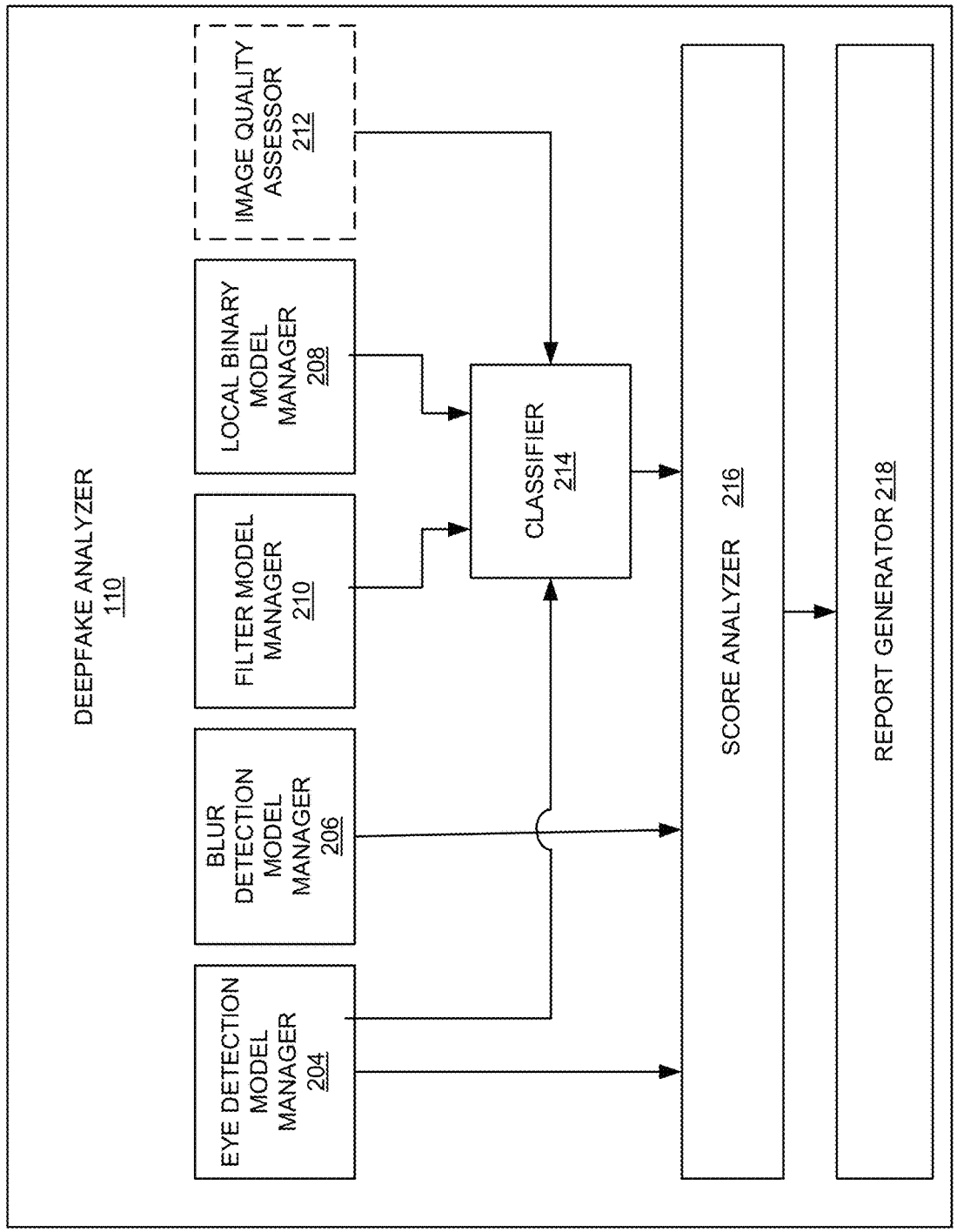
FIG. 2B is a block diagram of another example implementation of the deepfake analyzer of FIGS. 1 and 2A.

FIG. 2B is a block diagram of another example implementation of the deepfake analyzer 110 of FIGS. 1 and 2A. The illustration of FIG. 2B includes the eye detection model manager 204, the blur detection model manager 206, the local binary model manager 208, the filter model manager 210, the image quality assessor 212, the classifier 214, the score analyzer 216, and the report generator 218. In FIG. 2B, the eye detection model manager 204, the blur detection model manager 206, the local binary model manager 208, the filter model manager 210, the image quality assessor 212, the classifier 214, the score analyzer 216, and the report generator 218 are implemented in accordance with the teachings of this disclosure.

In the example of FIG. 2B, the classifier 214 obtains example results from the eye detection model manager 204, the local binary model manager 208, the filter model manager 210, and/or the image quality assessor 212. Additionally, the score analyzer 216 obtains the results from the eye detection model manager 204, the blur detection model manager 206 and the classifier 214 to generate a result in accordance with the teachings of this disclosure.

Figure 3:
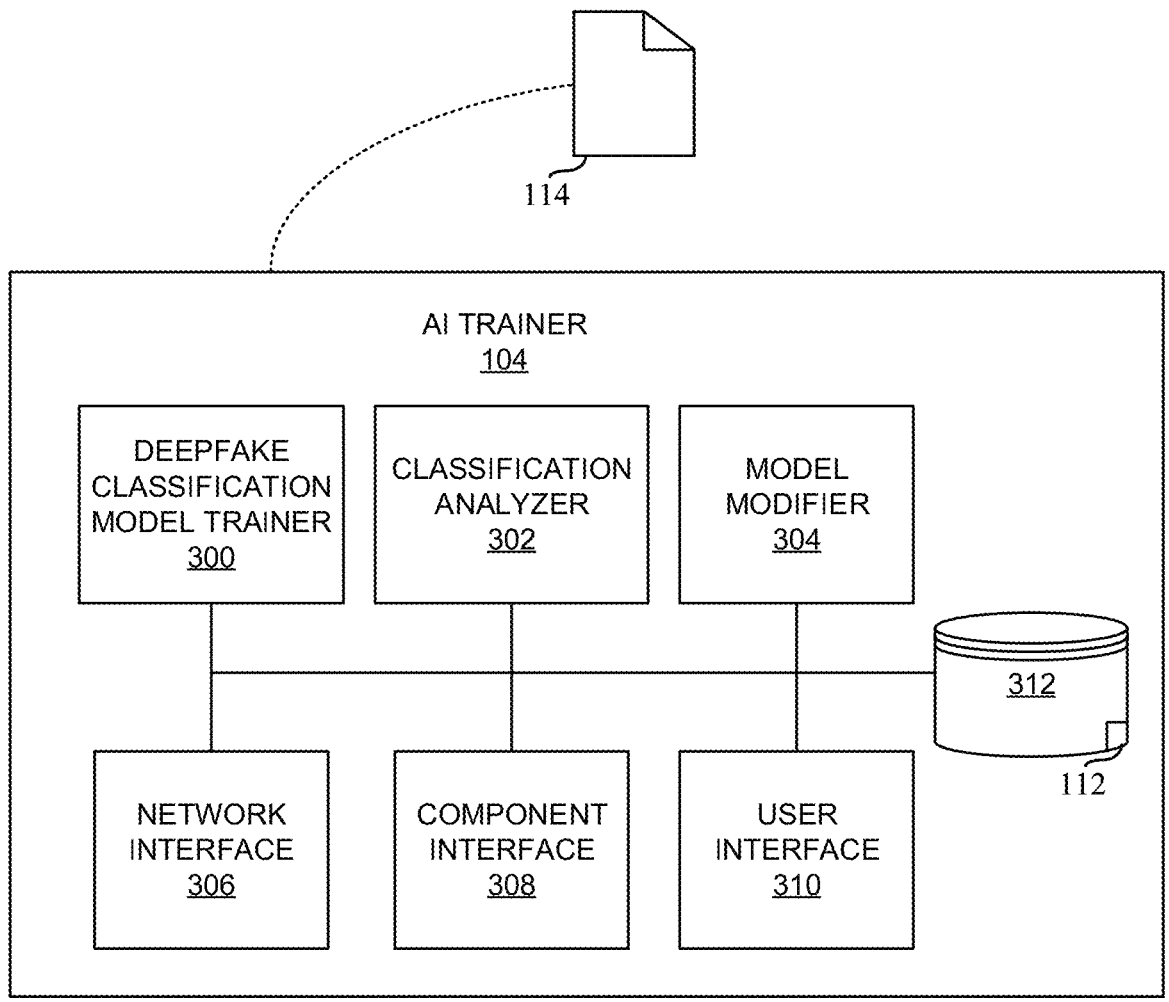
FIG. 3 is a block diagram of an example implementation of the AI trainer of FIG. 1.

FIG. 3 is a block diagram of an example implementation of the AI trainer 104 of FIG. 1. The example AI trainer 104 includes an example deepfake classification model trainer 300, an example classification analyzer 302, an example model modifier 304, an example network interface 306, an example component interface 308, an example user interface 310, and an example data store 312.

The example deepfake classification model trainer 300 of FIG. 3 generates a model (e.g., the AI model 112) based on a dataset of media (e.g., the input dataset 114) that has known classifications (e.g., known to be authentic or deepfake). The deepfake classification model trainer 300 trains based on the input dataset 114 to be able to classify subsequent media as authentic or deepfake based on the characteristics of the known dataset used to train the AI model 112. In some examples, the deepfake classification model trainer 300 trains using a portion of the input dataset 114. In this manner, the example deepfake analyzer 110 can use the remaining portion of the input dataset 114 to test the initially trained AI model 112 to verify the accuracy of the AI model 112. The example deepfake classification model trainer 300 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

The example classification analyzer 302 of FIG. 3 analyzes the classifications of media in the input dataset 114 using the AI model 112 during testing. For example, after an initial training of the AI model 112, a portion of the input dataset 114 with known classifications may be used to test the initially trained AI model 112. In such an example, the classification analyzer 302 may obtain the results of the classification of a particular media of the input dataset 114 from the initially trained AI model 112 and compare to the known classification of the particular media to determine if the initially trained AI model 112 properly classifies the media.

In some examples, the classification analyzer 302 transmits a prompt to a user and/or administrator (e.g., via the user interface 310) to have the user and/or administrator diagnose possible reasons for a misclassification. In this manner, the user and/or administrator can instruct the model modifier 304 to tune or otherwise adjust the AI model 112 based on the reasons for the misclassification. In some examples, the classification analyzer 302 automatically determines possible reasons for the misclassification. The example classification analyzer 302 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

The example model modifier 304 of FIG. 3 modifies (e.g., tunes or adjusts) the AI model 112 based on the reasons for a misclassification. For example, if the reasons for misclassification were due to the AI model 112 using particular parts of an image that are deemed unimportant by the classification analyzer 302, a user, and/or an administrator, the model modifier 304 adjusts the weights of the AI model 112 to deemphasize the unimportant parts. In some examples, the model modifier 304 may adjust the AI model 112 based on results from deployed models. For example, if the AI model 112 is deployed to the deepfake analyzer 110 in the processing device 108, the deepfake analyzer 110 may transmit reports to the example AI trainer 104. If there are deviations, the model modifier 304 may adjust the AI model 112 based on the deviation. The example model modifier 304 of the illustrated example of FIG. 3 is implemented by a logic circuit such as, for example, a hardware processor. However, any other type of circuitry may additionally or alternatively be used such as, for example, one or more analog or digital circuit(s), logic circuits, programmable processor(s), application specific integrated circuit(s) (ASIC(s)), programmable logic device(s) (PLD(s)), field programmable logic device(s) (FPLD(s)), digital signal processor(s) (DSP(s)), etc.

The example network interface 306 of FIG. 3 transmits and/or receives data to/from the example deepfake analyzer 110 via the example network 106 (e.g., when the deepfake analyzer 110 is implemented in the example processing device 108). For example, the network interface 306 may transmit the AI model 112 (e.g., instructions that includes a set of weights to apply to the neurons of a CNN to implement the AI model 112) to the example processing device 108. Additionally, the network interface 306 may receive reports to the example deepfake analyzer 110. In the illustrated example, the network interface 306 is implemented by a WiFi radio that communicates with the deepfake analyzer 110. In some examples, the network interface 306 facilitates wired communication via an Ethernet network. In other examples disclosed herein, any other type of wired and/or wireless transceiver may additionally or alternatively be used to implement the network interface 306.

The example component interface 308 of FIG. 3 transmits and/or receives data to/from the example deepfake analyzer 110 (e.g., when the deepfake analyzer 110 is implemented in the example server 102). For example, the component interface 308 transmits the AI model 112 to the example deepfake analyzer 110 and receives reports from the example deepfake analyzer 110. In the illustrated example, the component interface 308 is implemented by a WiFi radio that communicates with the deepfake analyzer 110. In some examples, the component interface 308 facilitates wired communication via an Ethernet network. In other examples disclosed herein, any other type of wired and/or wireless transceiver may additionally or alternatively be used to implement the component interface 308.

The example user interface 310 of FIG. 3 interfaces with a user and/or administrator to display a prompt showing input media, and/or corresponding classification information. In this manner, the example user and/or administrator interface with the user interface 310 to provide in the event media is misclassified.

In the example of FIG. 3, the data store 312 is configured to store the AI model 112, the input dataset 114, and/or any report obtained from the deepfake analyzer 110. The example data store 312 of the illustrated example of FIG. 3 may be implemented by any device for storing data such as, for example, flash memory, magnetic media, optical media, etc. Furthermore, the data stored in the example data store 312 may be in any data format such as, for example, binary data, comma delimited data, tab delimited data, structured query language (SQL) structures, etc.

While FIG. 3 illustrates a single AI trainer, any number of AI trainers may be implemented corresponding to any of the example network interface 200, the example component interface 202, the example eye detection model manager 204, the example blur detection model manager 206, the example local binary model manager 208, the example filter model manager 210, the example image quality assessor 212, the example classifier 214, the example score analyzer 216, and the example report generator 218.

FIG. 4 illustrates an example eye 400 and corresponding points 402a-f used to calculate an example eye aspect ratio. In the example illustrated in FIG. 4, the example eye detection model manager 204 of FIGS. 2A and/or 2B identifies and/or otherwise determines the points 402a-f as landmarks of an the eye 400. In this manner, the eye detection model manager 204 extracts the eye 400 from the input media 118. In connection with Equation 1, point 402a may correspond to the variable p1, point 402b may correspond to the variable p2, point 402c may correspond to the variable p3, point 402d may correspond to the variable p4, point 402e may correspond to the point p5, and point 402f may correspond to the point p6.

Figure 5:
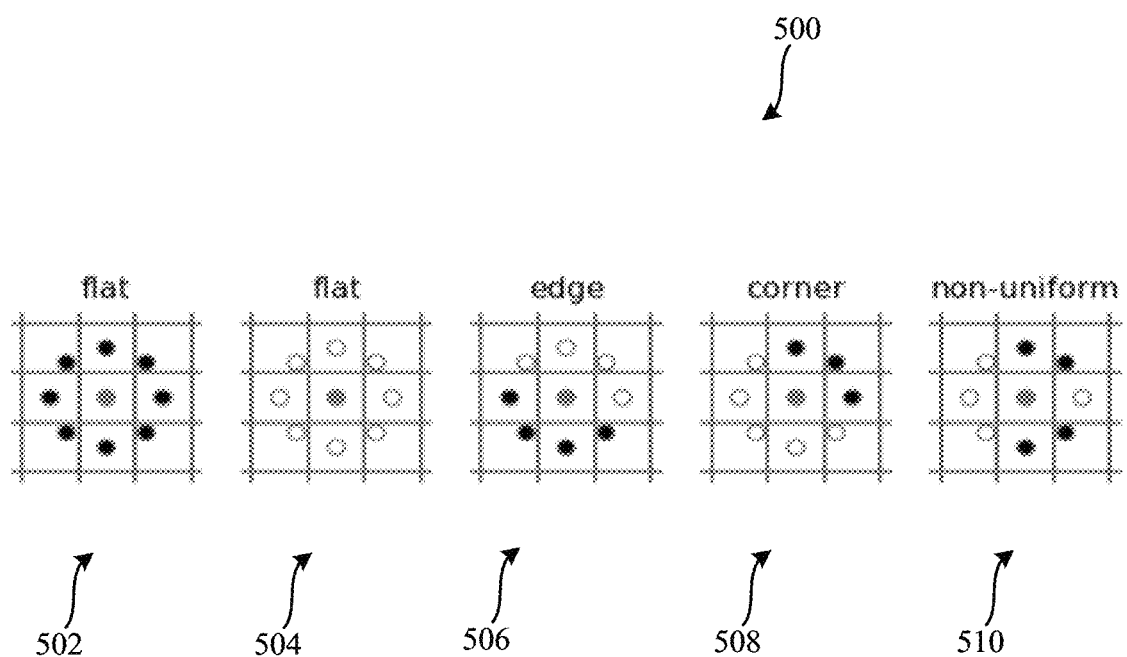
FIG. 5 illustrates example patterns generated by the local binary model manager.

FIG. 5 illustrates example patterns 500 generated by the local binary model manager 208. Illustrated in FIG. 5, the patterns 500 are generated by the local binary model manager 208 in response to executing an LBP operation. The example patterns 500 includes a first example characterization 502, a second example characterization 504, a third example characterization 506, a fourth example characterization 508, and a fifth example characterization 510.

In FIG. 5, the first example characterization 502 corresponds to the pattern, flat. The second example characterization 504 corresponds to the pattern, flat, as depicted with the absence of pixels. The third example characterization 506 corresponds to the pattern, edge. The fourth example characterization 508 corresponds to the pattern, corner. The fifth example characterization 510 corresponds to the pattern, non-uniform.

Figure 6:
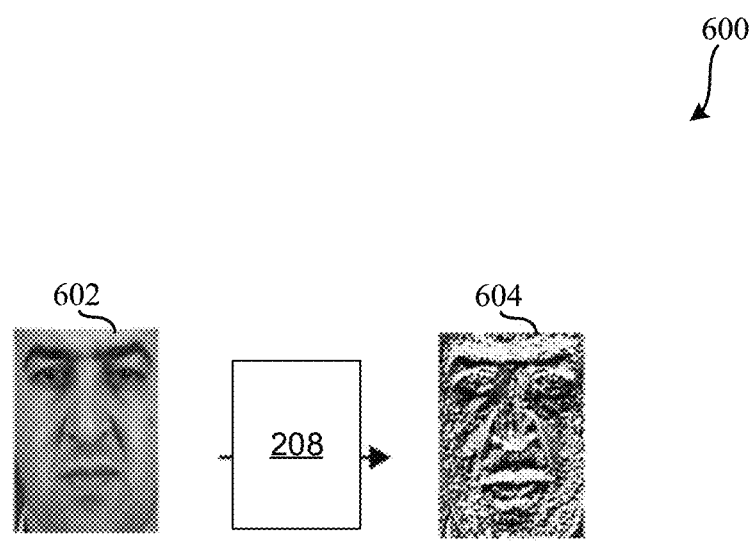
FIG. 6 illustrates an example input media processed by the example local binary model manager of FIGS. 2A and/or 2B.

FIG. 6 illustrates an example input media 602 processed by the example local binary model manager 208 of FIGS. 2A and/or 2B. The input media 602 of FIG. 6 may be the example input media 118 of FIG. 1. Illustrated in FIG. 6, the local binary model manager 208 obtains the input media 602 and generates an example result image 604.

Figure 7:
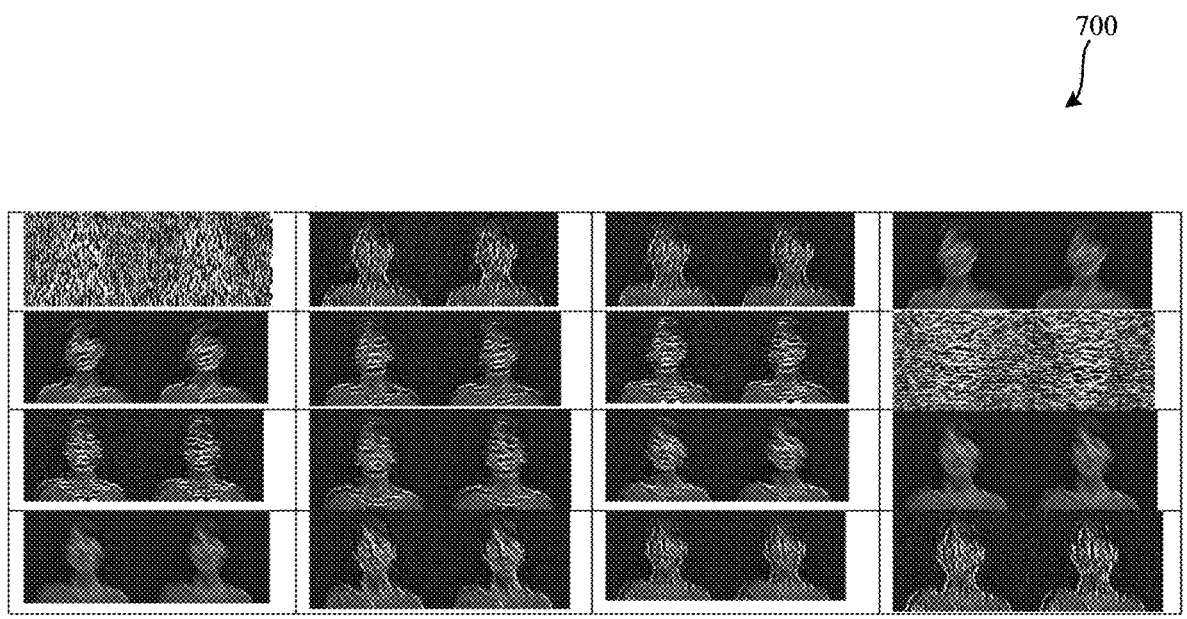
FIG. 7 illustrates example resultant patterns generated the filter model manager of FIGS. 2A and/or 2B.

FIG. 7 illustrates example resultant patterns 700 generated the filter model manager 210 of FIGS. 2A and/or 2B. For example, FIG. 7 depicts the example resultant patterns 700 obtained from the filter model manager 210 applying sixteen Gabor filters. By using sixteen filters having orientations equally distributed from zero to one hundred and eighty degrees, patterns can be obtained for a variety of orientations. In some examples disclosed herein, the resultant patterns 700 are used by the filter model manager 210 to generate a histogram for use by the classifier 214.

FIG. 8 illustrates features extracted for use by the image quality assessor 212 of FIGS. 2A and/or 2B to perform image quality assessment. In examples disclosed herein, features included in example columns 802, 804, 806, 808, 810, 812, 814, 816, 818, 820, 822, and 824 (e.g., columns 1, 4, 5, 7, 8, 9, 11, 12, 13, 15, 16, and 16) are utilized with higher discrimination power for deepfake and real videos. In other examples disclosed herein, any suitable feature may be utilized. While the example of FIG. 8 includes feature values, such feature values are examples and, as such, any suitable feature value (e.g., any suitable numerical value) may be included and/or utilized. In some examples disclosed herein, results (e.g., extracted features) from the image quality assessor 212 are provided to the classifier 214 to obtain the probabilities for real or malicious (e.g., fake, deepfake, etc.).

FIG. 9 includes example results obtained and/or otherwise produced by the deepfake analyzer 110 of FIGS. 1, 2A, and/or 2B. In the example of FIG. 9, a first result set 902 corresponds to results for a first dataset (e.g., UAVDF dataset). Likewise, an example second result set 904 corresponds to results for a second dataset (e.g., VidTimit dataset). In examples disclosed herein, the first dataset (e.g., UAVDF dataset) and/or the second data set (e.g., VidTimit dataset) may be included in the input media 118.

While an example manner of implementing the deepfake analyzer 110 of FIG. 1 is illustrated in FIGS. 2A and/or 2B, one or more of the elements, processes and/or devices illustrated in FIGS. 2A and/or 2B may be combined, divided, re-arranged, omitted, eliminated and/or implemented in any other way. Further, the example network interface 200, the example component interface 202, the example eye detection model manager 204, the example blur detection model manager 206, the example local binary model manager 208, the example filter model manager 210, the example image quality assessor 212, the example classifier 214, the example score analyzer 216, the example report generator 218, the example data store 220, and/or, more generally, the example deepfake analyzer 110 of FIG. 1 may be implemented by hardware, software, firmware and/or any combination of hardware, software and/or firmware. Thus, for example, any of the example network interface 200, the example component interface 202, the example eye detection model manager 204, the example blur detection model manager 206, the example local binary model manager 208, the example filter model manager 210, the example image quality assessor 212, the example classifier 214, the example score analyzer 216, the example report generator 218, the example data store 220, and/or, more generally, the example deepfake analyzer 110 of FIG. 1 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 200, the example component interface 202, the example eye detection model manager 204, the example blur detection model manager 206, the example local binary model manager 208, the example filter model manager 210, the example image quality assessor 212, the example classifier 214, the example score analyzer 216, the example report generator 218, and the example data store 220 is/are hereby expressly defined to include a non-transitory computer readable storage device or storage disk such as a memory, a digital versatile disk (DVD), a compact disk (CD), a Blu-ray disk, etc. including the software and/or firmware. Further still, the example deepfake analyzer 110 of FIG. 1 may include one or more elements, processes and/or devices in addition to, or instead of, those illustrated in FIGS. 2A and/or 2B, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 10:
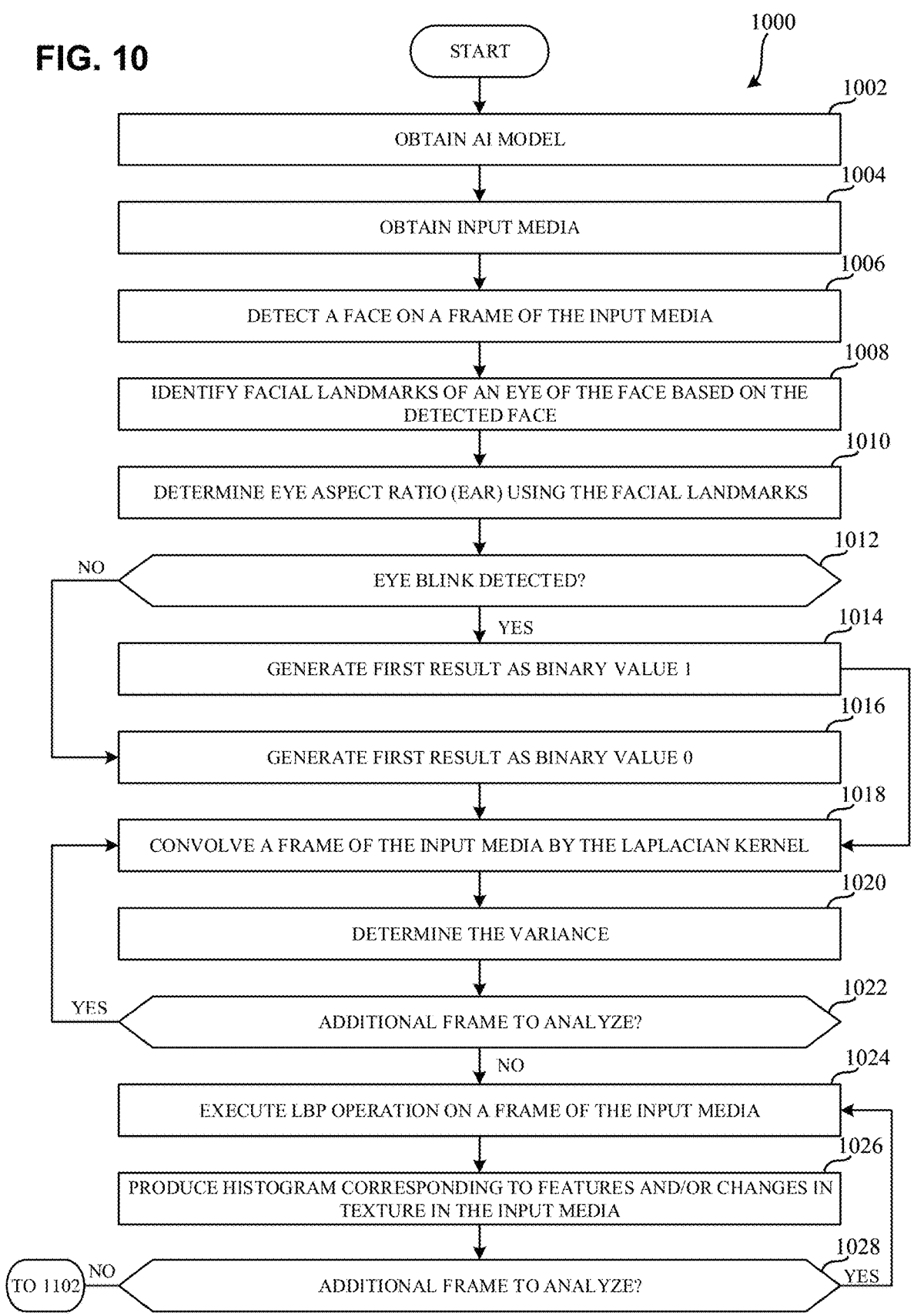
FIG. 10 is a flowchart representative of example machine readable instructions that may be executed by a processor to implement the example deepfake analyzer of FIGS. 1, 2A, and/or 2B to process input media.

Flowcharts representative of example hardware logic, machine readable instructions, hardware implemented state machines, and/or any combination thereof for implementing the deepfake analyzer 110 of FIGS. 1, 2A, and/or 2B are shown in FIGS. 10 and/or 11. The machine readable instructions may be one or more executable programs or portion(s) of an executable program for execution by a computer processor such as the processor 1212 shown in the example processor platform 1200 discussed below in connection with FIG. 12. The program may be embodied in software stored on a non-transitory computer readable storage medium such as a CD-ROM, a floppy disk, a hard drive, a DVD, a Blu-ray disk, or a memory associated with the processor 1212, but the entire program and/or parts thereof could alternatively be executed by a device other than the processor 1212 and/or embodied in firmware or dedicated hardware. Further, although the example program is described with reference to the flowcharts illustrated in FIGS. 10 and/or 11 many other methods of implementing the example deepfake analyzer 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example processes of FIGS. 10 and/or 11 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 10 is a flowchart representative of example machine readable instructions 1000 that may be executed by a processor to implement the example deepfake analyzer 110 of FIGS. 1, 2A, and/or 2B to process input media 118.

At block 1002, the example deepfake analyzer 110 of FIGS. 1, 2A, and/or 2B obtains the example AI model 112. (Block 1002). In examples disclosed herein, the example network interface 200 of FIG. 2A obtains the example AI model 112 from the example AI trainer 104 via the example network 106. For example, the network interface 200 may receive the AI model 112 (e.g., instructions that identify a set of weights to apply to the neurons of a CNN to implement the trained model) from the example AI trainer 104.

At block 1004, the deepfake analyzer 110 obtains the example input media 118. (Block 1004). In examples disclosed herein, the network interface 200 of FIG. 2A is configured to obtain example the input media 118.

At block 1006, the deepfake analyzer 110 detects a face on a frame of the input media 118. (Block 1006). In examples disclosed herein, the example eye detection model manager 204 of FIGS. 2A and/or 2B is configured to detect a human face in the input media 118.

In response to the execution of the instructions represented in block 1006, the deepfake analyzer 110 identifies facial landmarks of an eye of the face based on the detected face. (Block 1008). In examples disclosed herein, the eye detection model manager 204 identifies and/or otherwise determines the facial landmarks (e.g., a nose, eyes, mouth, etc.).

At block 1010, the deepfake analyzer 110 determines the eye aspect ratio (EAR) using the facial landmarks. (Block 1010). In examples disclosed herein, the eye detection model manager 204 determines (e.g., calculates) an eye aspect ratio (EAR) by executing computer readable instructions represented in equation 1 above.

At block 1012, the deepfake analyzer 110 detects whether an eye blink occurred. (Block 1012). In examples disclosed herein, the eye detection model manager 204 detects whether a blink occurred if the EAR satisfies a threshold. For example, if the EAR is less than a threshold, the eye detection model manager 204 may determine a blink occurred.

In the event the deepfake analyzer 110 (e.g., the eye detection model manager 204) determines that an eye blink occurred (e.g., the control of block 1012 returns a result of YES), then the deepfake analyzer 110 generates a result as a binary value of 1. (Block 1014). In examples disclosed herein, the eye detection model manager 204 generates a result as a binary value of 1 in response to detecting a blink has occurred.

Alternatively, in the event the deepfake analyzer 110 (e.g., the eye detection model manager 204) determines that an eye blink did not occur (e.g., the control of block 1012 returns a result of NO), the deepfake analyzer 110 generates a result as a binary value of 0. (Block 1016). In examples disclosed herein, the eye detection model manager 204 generates a result as a binary value of 0 in response to detecting a blink has not occurred.

Responsive to the execution of the instructions represented blocks 1014 or 1016, the deepfake analyzer 110 convolves a frame of the input media 118 by the Laplacian kernel. (Block 1018). In examples disclosed herein, the example blur detection model manager 206 of FIGS. 2A and/or 2B is configured to convolve the input media 118 by the Laplacian kernel.

At block 1020, the deepfake analyzer 110 determines (e.g., calculates) the variance of the result of the instructions represented in block 1018. (Block 1020). In examples disclosed herein, the blur detection model manager 206 determines (e.g., calculate) the variance of the result.

At block 1022, the deepfake analyzer 110 determines whether there is an additional frame to analyze. (Block 1022). In examples disclosed herein, the blur detection model manager 206 determines whether there is an additional frame to analyze. In the event the deepfake analyzer 110 (e.g., the blur detection model manager 206) determines there is an additional frame to analyze (e.g., the control of block 1022 returns a result of YES), the process returns to block 1018.

Alternatively, in the event the deepfake analyzer 110 (e.g., the blur detection model manager 206) determines that there are no additional frames to analyze (e.g., the control of block 1022 returns a result of NO), the deepfake analyzer 110 executes a Local Binary Pattern (LPB) operation (e.g., technique) on a frame of the input media 118. (Block 1024). In examples disclosed herein, the local binary model manager 208 executes a Local Binary Pattern (LBP) technique to compute a local representation of texture of a frame of the input media 118. For example, the local binary model manager 208 compares each pixel with its surrounding neighborhood of pixels in the input media 118.

Accordingly, the deepfake analyzer 110 produces a histogram corresponding to various features and/or changes in texture in the input media 118. (Block 1026). In examples disclosed herein, the local binary model manager 208 produces a histogram corresponding to various features and/or changes in texture in the input media 118.

At block 1028, the deepfake analyzer 110 determines whether there is an additional frame to analyze. (Block 1028). In examples disclosed herein, the local binary model manager 208 determines whether there is an additional frame to analyze. In the event the deepfake analyzer 110 (e.g., the local binary model manager 208) determines there is an additional frame to analyze (e.g., the control of block 1028 returns a result of YES), the process returns to block 1024.

Figure 11:
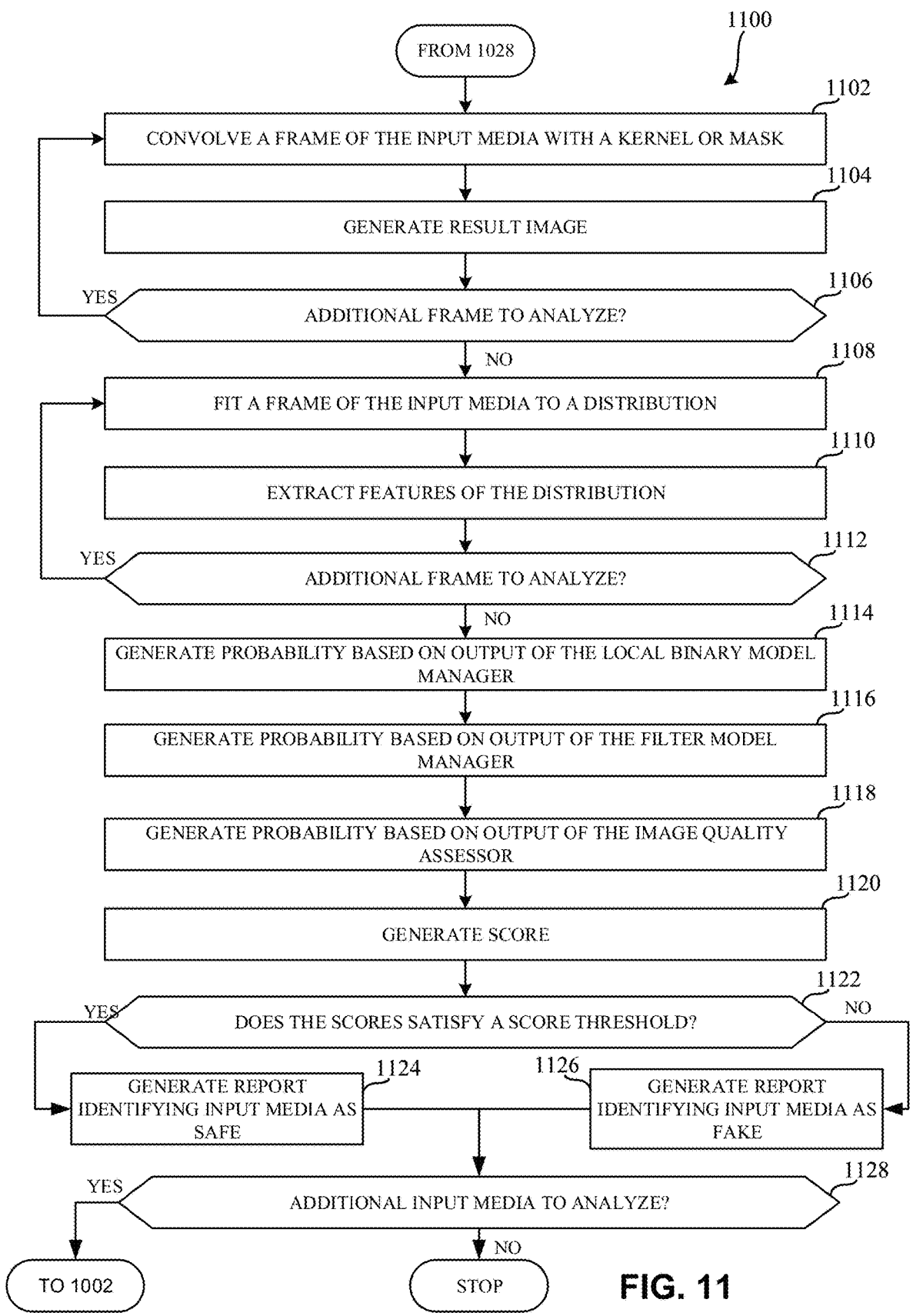
FIG. 11 is a flowchart representative of example machine readable instructions that may be executed by a processor to implement the example deepfake analyzer of FIGS. 1, 2A, and/or 2B to process input media.

Alternatively, in the event the deepfake analyzer 110 (e.g., the local binary model manager 208) determines that there are no additional frames to analyze (e.g., the control of block 1028 returns a result of NO), the process proceeds to block 1102 of FIG. 11.

FIG. 11 is a flowchart representative of example machine readable instructions 1100 that may be executed by a processor to implement the example deepfake analyzer 110 of FIGS. 1, 2A, and/or 2B to process input media 118.

At block 1102, the deepfake analyzer 110 convolves a frame of the input media 118 with a kernel or mask. (Block 1102). In examples disclosed herein, the filter model manager 210 may appl Gabor filters to the input media 118 by convolving a kernel or mask with the input media 118 which, in turn, filters certain frequencies or signals from the input media 118.

In response to the execution of the instructions represented in block 1102, the deepfake analyzer 110 generates a resultant image. (Block 1104). In examples disclosed herein, the filter model manager 210 generates a result image. For example, when the filter model manager 210 applies a Gabor filter to the input media 118, the result is a corresponding combination of signals extracted from the frame(s) of the input media 118. For example, the filter model manager 210 may execute the instructions represented by equation 2, above.

At block 1106, the deepfake analyzer 110 determines whether there is an additional frame to analyze. (Block 1106). In examples disclosed herein, the filter model manager 210 determines whether there is an additional frame to analyze. In the event the deepfake analyzer 110 (e.g., the filter model manager 210) determines there is an additional frame to analyze (e.g., the control of block 1106 returns a result of YES), the process returns to block 1102.

Alternatively, in the event the deepfake analyzer 110 (e.g., the filter model manager 210) determines that there are no additional frames to analyze (e.g., the control of block 1106 returns a result of NO), the deepfake analyzer fits a frame of the input media 118 to a distribution (e.g., a Generalized Gaussian Distribution and/or an Asymmetric Gaussian Distribution). (Block 1108). In examples disclosed herein, the image quality assessor 212 fits a frame of the input media 118 to a distribution (e.g., a Generalized Gaussian Distribution and/or an Asymmetric Gaussian Distribution).

In response to the instructions represented in block 1108, the deepfake analyzer 110 extracts features of the distribution. (Block 1110). In examples disclosed herein, the example image quality assessor 212 extracts different features from the input media 118. In examples disclosed herein, the features extracted by the image quality assessor 212 may be referred to as a result of the image quality assessor 212.

At block 1112, the deepfake analyzer 110 determines whether there is an additional frame to analyze. (Block 1112). In examples disclosed herein, the image quality assessor 212 determines whether there is an additional frame to analyze. In the event the deepfake analyzer 110 (e.g., the image quality assessor 212) determines there is an additional frame to analyze (e.g., the control of block 1112 returns a result of YES), the process returns to block 1108.

Alternatively, in the event the deepfake analyzer 110 (e.g., the image quality assessor 212) determines that there are no additional frames to analyze (e.g., the control of block 1112 returns a result of NO), the deepfake analyzer 110 generates a probability based on the output of the local binary model manager 208. (Block 1114). In examples disclosed herein, the classifier 214 obtains the output (e.g., result) from the local binary model manager 208 (e.g., a histogram corresponding to various features and/or changes in texture) and generates a probability corresponding to the likelihood that the input media 118 is authentic or a deepfake.

At block 1116, the deepfake analyzer 110 generates a probability based on the output of the filter model manager 210. (Block 1116). In examples disclosed herein, the classifier 214 obtains the output (e.g., result) from the filter model manager 210 (e.g., a histogram corresponding to a final signal of the filter model manager 210) and generates a probability corresponding to the likelihood that the input media 118 is authentic or a deepfake.

At block 1118, the deepfake analyzer 110 generates a probability based on the output of the image quality assessor 212. (Block 1118). In examples disclosed herein, the classifier 214 obtains the output (e.g., result) from the image quality assessor 212 (e.g., extracted features) and generates a probability corresponding to the likelihood that the input media 118 is authentic or a deepfake.

At block 1120, the deepfake analyzer 110 generates a score. (Block 1120). In examples disclosed herein, the score analyzer 216 utilizes an algorithm to combine the result of the eye detection model manager 204, the result of the blur detection model manager 206, the probability generated by the classifier 214 corresponding to the result of the local binary model manager 208, the probability generated by the classifier 214 corresponding to the result of the filter model manager 210, and/or the probability generated by the classifier 214 corresponding to the result of the image quality assessor 212 to generate a score. In examples disclosed herein, the score analyzer 216 may use equation 3 above to generate the score.

At block 1122, the deepfake analyzer 110 determines whether the score satisfies a score threshold. (Block 1122). In examples disclosed herein, the report generator 218 determines whether the score satisfies a score threshold. For example, if the score is greater than or equal to 0 and less than or equal to 0.5, the report generator 218 determines that the input media 118 is a deepfake. Alternatively, if the score is between a 0.50 and a 1.0 (e.g., greater than 0.50 and less than or equal to 1), the report generator 218 determines that the input media 118 is authentic.

In the event the deepfake analyzer 110 (e.g., the report generator 218) determines the score satisfies a score threshold (e.g., the control of block 1122 returns a result of YES), the example deepfake analyzer 110 generates a report identifying and/or including the input media 118 as authentic. (Block 1124). In examples disclosed herein, the report generator 218, responsive to determining that the score satisfies a score threshold, generates a report identifying and/or including the input media 118 as authentic.

In the event the deepfake analyzer 110 (e.g., the report generator 218) determines the score does not satisfy a score threshold (e.g., the control of block 1122 returns a result of NO), the example deepfake analyzer 110 generates a report identifying and/or including the input media 118 as a deepfake. (Block 1126). In examples disclosed herein, the report generator 218, responsive to determining that the score does not satisfy a score threshold, generates a report identifying and/or including the input media 118 as a deepfake.

Responsive to the instructions represented in either block 1124 or block 1126, the deepfake analyzer 110 determines whether there is additional media to analyze. (Block 1128). In examples disclosed herein, the network interface 200 determines whether there is additional media to analyze.

In the event the deepfake analyzer 110 (e.g., the network interface 200) determines that there is additional media to analyze (e.g., the control of block 1128 returns a result of YES), control returns to block 1002 of FIG. 10. Alternatively, in the event the deepfake analyzer 110 (e.g., the network interface 200) determines that there is no additional media to analyze (e.g., the control of block 1128 returns a result of NO), the process stops.

Figure 12:
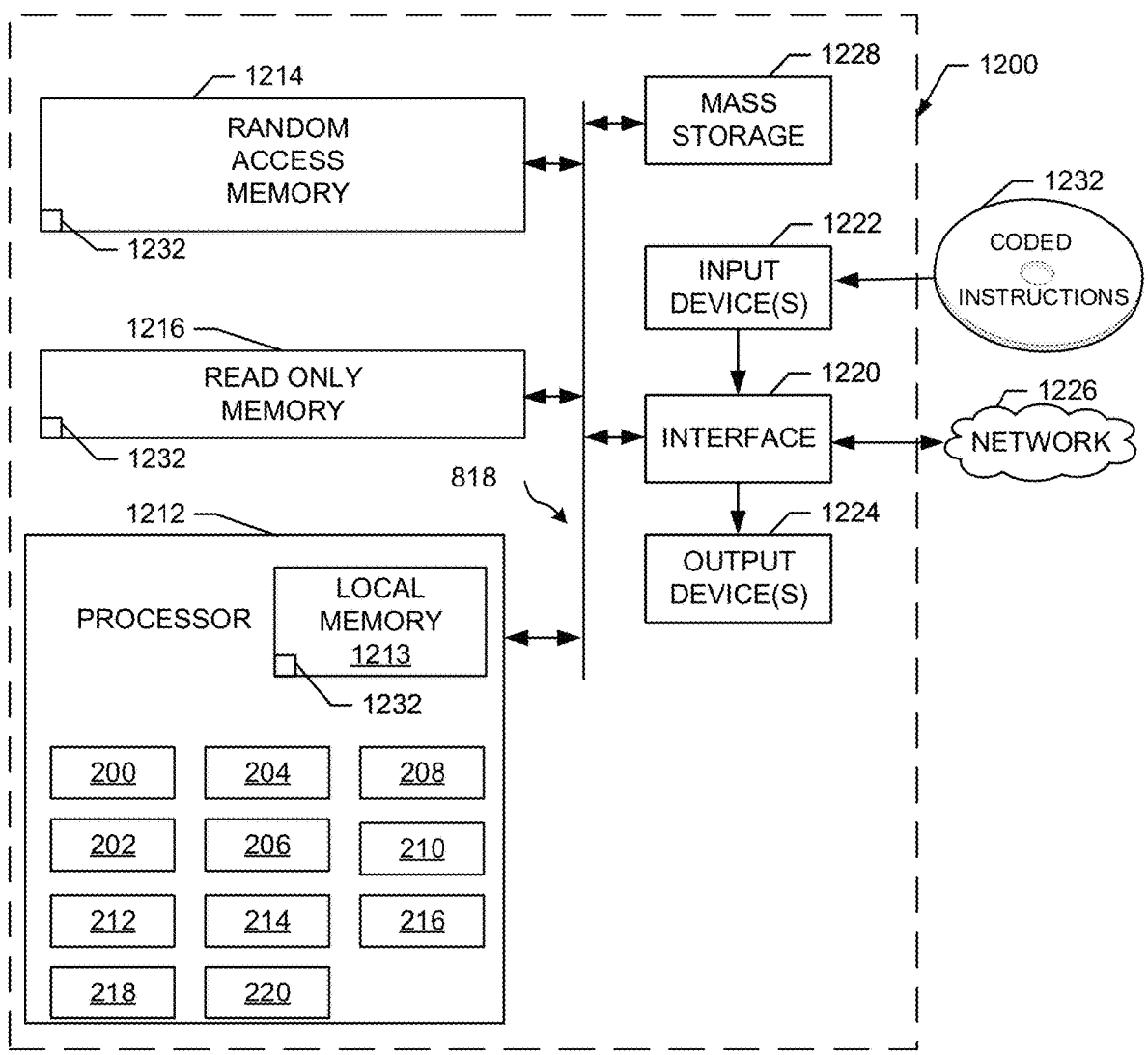
FIG. 12 is a block diagram of an example processor platform structured to execute the instructions of FIGS. 10 and/or 11 to implement the deepfake analyzer of FIGS. 1, 2A, and/or 2B.

FIG. 12 is a block diagram of an example processor platform 1200 structured to execute the instructions of FIGS. 10 and/or 11 to implement the deepfake analyzer 110 of FIGS. 1, 2A, and/or 2B. The processor platform 1200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 1200 of the illustrated example includes a processor 1212. The processor 1212 of the illustrated example is hardware. For example, the processor 1212 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 200, the example component interface 202, the example eye detection model manager 204, the example blur detection model manager 206, the example local binary model manager 208, the example filter model manager 210, the example image quality assessor 212, the example classifier 214, the example score analyzer 216, the example report generator 218, the example data store 220, and/or, more generally, the example deepfake analyzer 110 of FIG. 1.

The processor 1212 of the illustrated example includes a local memory 1213 (e.g., a cache). The processor 1212 of the illustrated example is in communication with a main memory including a volatile memory 1214 and a non-volatile memory 1216 via a bus 1218. The volatile memory 1214 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 1216 may be implemented by flash memory and/or any other desired type of memory device. Access to the main memory 1214, 1216 is controlled by a memory controller.

The processor platform 1200 of the illustrated example also includes an interface circuit 1220. The interface circuit 1220 may be implemented by any type of interface standard, such as an Ethernet interface, a universal serial bus (USB), a Bluetooth® interface, a near field communication (NFC) interface, and/or a PCI express interface.

In the illustrated example, one or more input devices 1222 are connected to the interface circuit 1220. The input device(s) 1222 permit(s) a user to enter data and/or commands into the processor 1212. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 1224 are also connected to the interface circuit 1220 of the illustrated example. The output devices 1224 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 1220 of the illustrated example, thus, typically includes a graphics driver card, a graphics driver chip and/or a graphics driver processor.

The interface circuit 1220 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 1226. The communication can be via, for example, an Ethernet connection, a digital subscriber line (DSL) connection, a telephone line connection, a coaxial cable system, a satellite system, a line-of-site wireless system, a cellular telephone system, etc.

The processor platform 1200 of the illustrated example also includes one or more mass storage devices 1228 for storing software and/or data. Examples of such mass storage devices 1228 include floppy disk drives, hard drive disks, compact disk drives, Blu-ray disk drives, redundant array of independent disks (RAID) systems, and digital versatile disk (DVD) drives.

The machine executable instructions 1232 of FIGS. 10 and/or 11 may be stored in the mass storage device 1228, in the volatile memory 1214, in the non-volatile memory 1216, and/or on a removable non-transitory computer readable storage medium such as a CD or DVD.

Figure 13:
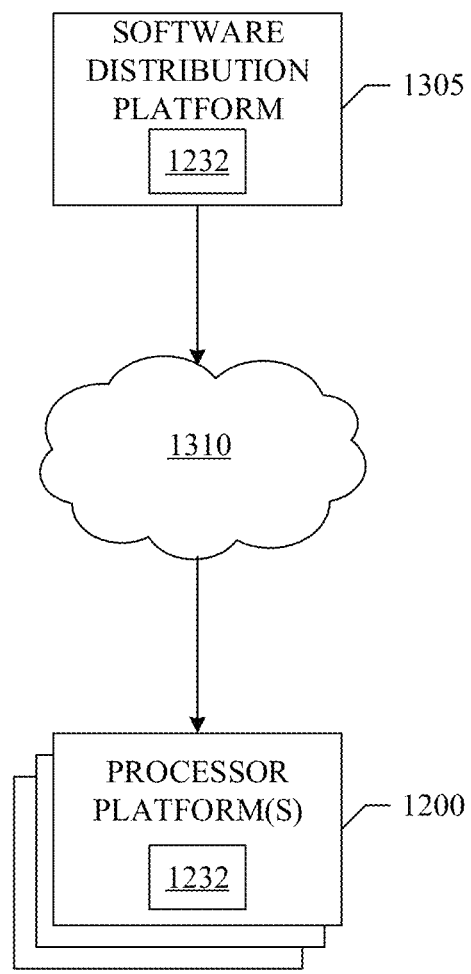
FIG. 13 is a block diagram of an example software distribution platform to distribute software (e.g., software corresponding to the example computer readable instructions of FIGS. 10 and/or 11) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 1305 to distribute software such as the example computer readable instructions 1232 of FIG. 12 to third parties is illustrated in FIG. 13. The example software distribution platform 1305 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 1232 of FIG. 12. The third parties may be consumers, users, retailers, OEMs, etc., who purchase and/or license the software for use and/or re-sale and/or sub-licensing. In the illustrated example, the software distribution platform 1305 includes one or more servers and one or more storage devices. The storage devices store the computer readable instructions 1232, which may correspond to the example computer readable instructions 1000, 1100 of FIGS. 10 and/or 11, as described above. The one or more servers of the example software distribution platform 1305 are in communication with a network 1310, which may correspond to any one or more of the Internet and/or any of the example networks (e.g., the network 106 of FIG. 1) described above. In some examples, the one or more servers are responsive to requests to transmit the software to a requesting party as part of a commercial transaction. Payment for the delivery, sale and/or license of the software may be handled by the one or more servers of the software distribution platform and/or via a third party payment entity. The servers enable purchasers and/or licensors to download the computer readable instructions 1232 from the software distribution platform 1305. For example, the software, which may correspond to the example computer readable instructions 1000, 1100 of FIGS. 10 and/or 111 may be downloaded to the example processor platform 1200, which is to execute the computer readable instructions 1232 to implement the deepfake analyzer 110. In some example, one or more servers of the software distribution platform 1305 periodically offer, transmit, and/or force updates to the software (e.g., the example computer readable instructions 1232 of FIG. 12) to ensure improvements, patches, updates, etc. are distributed and applied to the software at the end user devices.

From the foregoing, it will be appreciated that example methods, apparatus and articles of manufacture have been disclosed that utilize a unique combination of five different computer vision techniques. Moreover, examples disclosed herein include utilizing multiple Gabor kernels to extract different signals from input media (e.g., an image, a frame of a video, etc.). Examples disclosed herein further extend image quality assessment techniques to extract texture patterns in input media (e.g., an image, a frame of a video, etc.). Examples disclosed herein utilize the above-mentioned methods to generate a score to combine the results of each technique to more efficiently control false positives and false negatives when detecting deepfakes. For example, examples disclosed herein utilize computer techniques and machine learning techniques to generate individual results and/or otherwise scores corresponding to extracted features, a blur score, an eye blink, etc., and, using such results to determine whether input media (e.g., a video) is authentic or fake (e.g., a deepfake). The disclosed methods, apparatus and articles of manufacture improve the efficiency of using a computing device by efficiently detecting deepfake videos. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

Example methods, apparatus, systems, and articles of manufacture to detect deepfake content are disclosed herein. Further examples and combinations thereof include the following:

Example 1 includes an apparatus to determine whether input media is authentic, the apparatus comprising a classifier to generate a first probability based on a first output of a local binary model manager, a second probability based on a second output of a filter model manager, and a third probability based on a third output of an image quality assessor, and a score analyzer to obtain the first, second, and third probabilities from the classifier, and in response to obtaining a first result and a second result, generate a score indicative of whether the input media is authentic based on the first result, the second result, the first probability, the second probability, and the third probability.

Example 2 includes the apparatus of example 1, wherein the input media is authentic when the score is less than a score threshold.

Example 3 includes the apparatus of example 1, further including a filter model manager to generate the second output by applying a Gabor filter to a frame of the input media, and extracting signals from the frame of the input media responsive to the Gabor filter being applied, the signals corresponding to changes in texture in the input media.

Example 4 includes the apparatus of example 1, further including a blur detection model manager to generate the second result, the second result representative of a degree of blur in frames of the input media.

Example 5 includes the apparatus of example 1, further including an eye detection model manager to generate the first result, the first result being a binary value indicative of whether a blink occurred in a human face in the input media.

Example 6 includes the apparatus of example 5, wherein the eye detection model manager is to determine that the blink occurred when a ratio of points in an eye satisfies a threshold for four frames of the input media.

Example 7 includes the apparatus of example 1, wherein the first, second, and third probabilities correspond to a likelihood that the input media is a deepfake.

Example 8 includes a non-transitory computer readable medium comprising instructions which, when executed, cause at least one processor to generate a first probability based on a first output of a local binary model manager, a second probability based on a second output of a filter model manager, and a third probability based on a third output of an image quality assessor, and in response to obtaining a first result and a second result, generate a score indicative of whether input media is authentic based on the first result, the second result, the first probability, the second probability, and the third probability.

Example 9 includes the non-transitory computer readable medium of example 8, wherein the instructions, when executed, cause the at least one processor to determine the input media is authentic when the score is less than a score threshold.

Example 10 includes the non-transitory computer readable medium of example 8, wherein the instructions, when executed, cause the at least one processor to generate the second output by applying a Gabor filter to a frame of the input media, and extracting signals from the frame of the input media responsive to the Gabor filter being applied, the signals corresponding to changes in texture in the input media.

Example 11 includes the non-transitory computer readable medium of example 8, wherein the second result is representative of a degree of blur in frames of the input media.

Example 12 includes the non-transitory computer readable medium of example 8, wherein the first result is a binary value indicative of whether a blink occurred in a human face in the input media.

Example 13 includes the non-transitory computer readable medium of example 12, wherein the instructions, when executed, cause the at least one processor to determine that the blink occurred when a ratio of points in an eye satisfies a threshold for four frames of the input media.

Example 14 includes the non-transitory computer readable medium of example 8, wherein the first, second, and third probabilities correspond to a likelihood that the input media is a deepfake.

Example 15 includes a method to determine whether input media is authentic, the method comprising generating a first probability based on a first output of a local binary model manager, a second probability based on a second output of a filter model manager, and a third probability based on a third output of an image quality assessor, and in response to obtaining a first result and a second result, generating a score indicative of whether corresponding input media is authentic based on the first result, the second result, the first probability, the second probability, and the third probability. 16, the method of example 15, further including determining the input media is authentic when the score is less than a score threshold.

Example 17 includes the method of example 15, further including generating the second output by applying a Gabor filter to a frame of the input media, and extracting signals from the frame of the input media responsive to the Gabor filter being applied, the signals corresponding to changes in texture in the input media.

Example 18 includes the method of example 15 wherein the second result is representative of a degree of blur in frames of the input media.

Example 19 includes the method of example 15, wherein the first result is a binary value indicative of whether a blink occurred in a human face in the input media.

Example 20 includes the method of example 19, further including determine that the blink occurred when a ratio of points in an eye satisfies a threshold for four frames of the input media.

Example 21 includes the method of example 15, wherein the first, second, and third probabilities correspond to a likelihood that the input media is a deepfake.

Example 22 includes a server to distribute first instructions on a network, the server comprising at least one storage device including second instructions, and at least one processor to execute the second instructions to transmit the first instructions over the network, the first instructions, when executed, to cause at least one device to generate a first probability based on a first output of a local binary model manager, a second probability based on a second output of a filter model manager, and a third probability based on a third output of an image quality assessor, and in response to obtaining a first result and a second result, generate a score indicative of whether input media is authentic based on the first result, the second result, the first probability, the second probability, and the third probability.

Example 23 includes the server of example 22, wherein the first instructions, when executed, cause the at least one device to determine the input media is authentic when the score is less than a score threshold.

Example 24 includes the server of example 22, wherein the first instructions, when executed, cause the at least one device to generate the second output by applying a Gabor filter to a frame of the input media, and extracting signals from the frame of the input media responsive to the Gabor filter being applied, the signals corresponding to changes in texture in the input media.

Example 25 includes the server of example 22, wherein the second result is representative of a degree of blur in frames of the input media.

Example 26 includes the server of example 22, wherein the first result is a binary value indicative of whether a blink occurred in a human face in the input media.

Example 27 includes the server of example 26, wherein the first instructions, when executed, cause the at least one device to determine that the blink occurred when a ratio of points in an eye satisfies a threshold for four frames of the input media.

Example 28 includes the server of example 22, wherein the first, second, and third probabilities correspond to a likelihood that the input media is a deepfake.

What is claimed is:

1. An apparatus to determine whether input media is authentic, the apparatus comprising:
   a classifier to generate a first probability based on a first output of a local binary model manager, a second probability based on a second output of a filter model manager, and a third probability based on a third output of an image quality assessor; and
   a score analyzer to:
      obtain the first, second, and third probabilities from the classifier; and
      in response to obtaining a first result and a second result, generate a score indicative of whether the input media is authentic based on the first result, the second result, the first probability, the second probability, and the third probability.

2. The apparatus of claim 1, wherein the input media is authentic when the score is less than a score threshold.

3. The apparatus of claim 1, further including a filter model manager to generate the second output by:
   applying a Gabor filter to a frame of the input media; and
   extracting signals from the frame of the input media responsive to the Gabor filter being applied, the signals corresponding to changes in texture in the input media.

4. The apparatus of claim 1, further including a blur detection model manager to generate the second result, the second result representative of a degree of blur in frames of the input media.

5. The apparatus of claim 1, further including an eye detection model manager to generate the first result, the first result being a binary value indicative of whether a blink occurred in a human face in the input media.

6. The apparatus of claim 5, wherein the eye detection model manager is to determine that the blink occurred when a ratio of points in an eye satisfies a threshold for four frames of the input media.

7. The apparatus of claim 1, wherein the first, second, and third probabilities correspond to a likelihood that the input media is a deepfake.

8. A non-transitory computer readable medium comprising instructions which, when executed, cause at least one processor to at least:
   generate a first probability based on a first output of a local binary model manager, a second probability based on a second output of a filter model manager, and a third probability based on a third output of an image quality assessor; and
   in response to obtaining a first result and a second result, generate a score indicative of whether input media is authentic based on the first result, the second result, the first probability, the second probability, and the third probability.

9. The non-transitory computer readable medium of claim 8, wherein the instructions, when executed, cause the at least one processor to determine the input media is authentic when the score is less than a score threshold.

10. The non-transitory computer readable medium of claim 8, wherein the instructions, when executed, cause the at least one processor to generate the second output by:
    applying a Gabor filter to a frame of the input media; and
    extracting signals from the frame of the input media responsive to the Gabor filter being applied, the signals corresponding to changes in texture in the input media.

11. The non-transitory computer readable medium of claim 8, wherein the second result is representative of a degree of blur in frames of the input media.

12. The non-transitory computer readable medium of claim 8, wherein the first result is a binary value indicative of whether a blink occurred in a human face in the input media.

13. The non-transitory computer readable medium of claim 12, wherein the instructions, when executed, cause the at least one processor to determine that the blink occurred when a ratio of points in an eye satisfies a threshold for four frames of the input media.

14. The non-transitory computer readable medium of claim 8, wherein the first, second, and third probabilities correspond to a likelihood that the input media is a deepfake.

15. A method to determine whether input media is authentic, the method comprising:
generating a first probability based on a first output of a local binary model manager, a second probability based on a second output of a filter model manager, and a third probability based on a third output of an image quality assessor; and
in response to obtaining a first result and a second result, generating a score indicative of whether corresponding input media is authentic based on the first result, the second result, the first probability, the second probability, and the third probability.

16. The method of claim 15, further including determining the input media is authentic when the score is less than a score threshold.

17. The method of claim 15, further including generating the second output by:
applying a Gabor filter to a frame of the input media; and
extracting signals from the frame of the input media responsive to the Gabor filter being applied, the signals corresponding to changes in texture in the input media.

18. The method of claim 15 wherein the second result is representative of a degree of blur in frames of the input media.

19. The method of claim 15, wherein the first result is a binary value indicative of whether a blink occurred in a human face in the input media.

20. The method of claim 19, further including determine that the blink occurred when a ratio of points in an eye satisfies a threshold for four frames of the input media.

* * * * *